US011270130B2

(12) United States Patent
Kurz et al.

(10) Patent No.: US 11,270,130 B2
(45) Date of Patent: Mar. 8, 2022

(54) ROUTE INSPECTION SYSTEM

(71) Applicant: Transportation IP Holdings, LLC, Norwalk, CT (US)

(72) Inventors: Brian Kurz, Germantown, MD (US); Chris Schuchmann, Melbourne, FL (US); Robert Peipert, Melbourne, FL (US); Timothy Brown, Erie, PA (US); Derek Woo, Melbourne, FL (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 90 days.

(21) Appl. No.: 16/722,281

(22) Filed: Dec. 20, 2019

(65) Prior Publication Data
US 2020/0143173 A1 May 7, 2020

Related U.S. Application Data

(63) Continuation-in-part of application No. 15/651,067, filed on Jul. 17, 2017, now Pat. No. 10,558,865.

(60) Provisional application No. 62/371,609, filed on Aug. 5, 2016.

(51) Int. Cl.
*G06K 9/00* (2006.01)
*B61L 25/06* (2006.01)
*B61L 25/02* (2006.01)

(52) U.S. Cl.
CPC ........ *G06K 9/00791* (2013.01); *B61L 25/023* (2013.01); *B61L 25/028* (2013.01); *B61L 25/06* (2013.01)

(58) Field of Classification Search
CPC ............ G06K 9/00791; G06K 9/00651; B61L 25/06; B61L 25/028; B61L 25/023; B61L 23/04; B61L 23/047; B61L 23/041; B61L 23/048; B61K 9/08; G01C 21/3461; B60W 30/10
See application file for complete search history.

(56) References Cited

U.S. PATENT DOCUMENTS

2007/0211145 A1* 9/2007 Kilian ...................... B61K 9/12
348/148
2009/0040306 A1* 2/2009 Foote .................... B60R 1/0602
348/148
(Continued)

FOREIGN PATENT DOCUMENTS

EP          3007099 A1 *  4/2016  ............. G06T 7/269
JP       2015010456 A  *  1/2015

*Primary Examiner* — Marthe Y Marc-Coleman
(74) *Attorney, Agent, or Firm* — The Small Patent Law Group LLC; Joseph M. Butscher

(57) ABSTRACT

A system and method obtain first image data of a route at a location of interest from a first optical sensor disposed onboard a vehicle system moving along the route. The first image data depicts the route at the location of interest prior to passage of the vehicle system over the route at the location of interest. Second image data of the route at the location of interest is obtained from a second optical sensor disposed onboard the vehicle system. The second image data depicts the route at the location of interest after passage of the vehicle system over the route at the location of interest. A determination is made as to whether a change in the route has occurred at the location of interest by comparing the first image data with the second image data.

18 Claims, 19 Drawing Sheets

(56) References Cited

U.S. PATENT DOCUMENTS

| | | | |
|---|---|---|---|
| 2009/0173839 A1* | 7/2009 | Groeneweg | B61L 23/042 246/15 |
| 2015/0268172 A1* | 9/2015 | Naithani | B61L 23/048 348/129 |
| 2015/0269722 A1* | 9/2015 | Naithani | G06T 7/0004 382/104 |
| 2015/0307118 A1* | 10/2015 | Noffsinger | B60M 1/30 701/19 |
| 2015/0371095 A1* | 12/2015 | Hartmann | G06K 9/6267 348/148 |
| 2016/0046308 A1* | 2/2016 | Chung | B61L 25/021 701/20 |
| 2016/0292518 A1* | 10/2016 | Banitt | G06K 9/66 |
| 2017/0106885 A1* | 4/2017 | Singh | G01B 11/22 |
| 2017/0115166 A1* | 4/2017 | Bartonek | B61K 9/04 |
| 2017/0161568 A1* | 6/2017 | Karlsson | B61L 27/0094 |
| 2017/0270372 A1* | 9/2017 | Stein | H04N 7/18 |

* cited by examiner

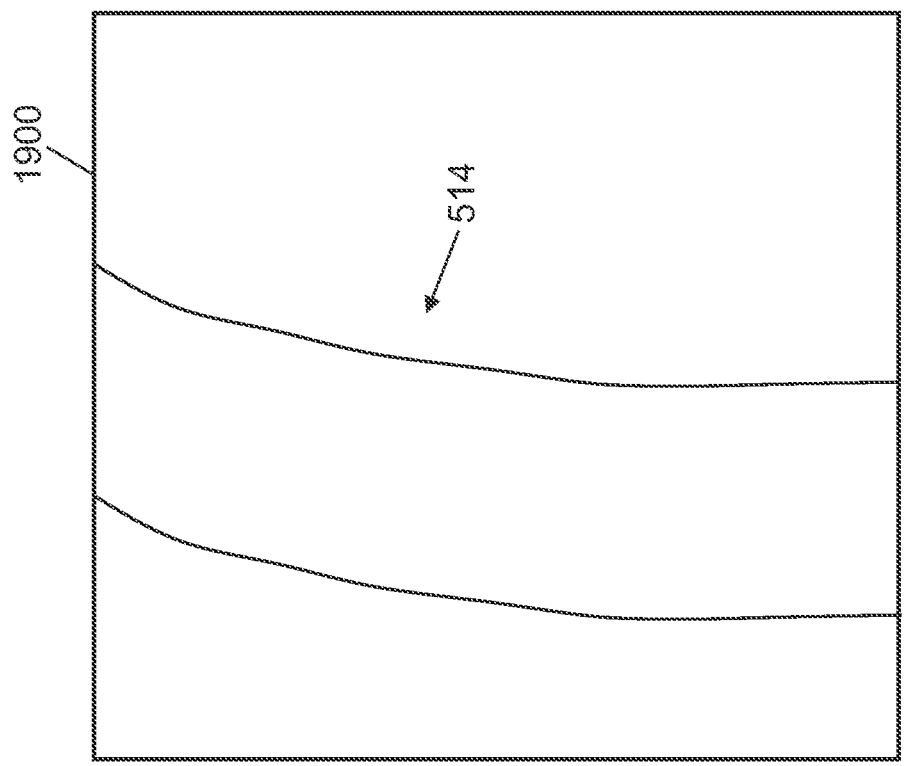

ROUTE INSPECTION SYSTEM

CROSS-REFERENCE TO RELATED APPLICATIONS

This application is a continuation-in-part of U.S. patent application Ser. No. 15/651,067, filed on 17 Jul. 2017, which claims priority to U.S. Provisional Application No. 62/371,609, filed on 5 Aug. 2016. The entire disclosures of which these applications are incorporated herein by reference.

FIELD

Embodiments of the subject matter disclosed herein relate to systems that inspect routes for deviations in shape of the route or other damage to the route. Other embodiments relate to systems for vehicle control based on route inspection.

BACKGROUND

Vehicles traveling on routes depend on the routes having a defined or consistent shape to ensure safe travel on the routes. As one example, rails of a track on which a rail vehicle moves need to have a defined shape that is free or substantially free (e.g., within manufacturing or installation tolerances) of deviations from the defined shape. Thermal misalignments are one example of misaligned rails in a track that can present a hazard to an approaching rail vehicle. These misalignments can include sun kinks, as the misalignments develop along the route during hot weather conditions when conductive components of the route (e.g., a rail) expand. The expansion creates compressive tension in the metal component, which causes the rail to buckle or otherwise become misaligned.

A thermal misalignment in a rail can include a lateral bending of the rail that is outside of a straight shape or designated bend in the rail. FIGS. 1 through 4 illustrate examples of such thermal misalignments in rails of a track. A length of a thermal misalignment that poses problems for travel of a rail vehicle may be on the order of forty to sixty feet, or twelve to eighteen meters (e.g., along the length of the track). Such a thermal misalignment can cause the rail to deviate from the intended or previous location of the rail (e.g., the location or shape of the rail as previously installed on a surface or as previously repaired) by as much as thirty inches or more (e.g., seventy-six centimeters).

Detection of these types of thermal misalignments in a route can aid in ensuring safe travel of vehicles over the route.

BRIEF DESCRIPTION

In one embodiment, a method includes obtaining first image data of a route at a location of interest from a first optical sensor disposed onboard a vehicle system moving along the route. The first image data depicts the route at the location of interest prior to passage of the vehicle system over the route at the location of interest. The method also includes obtaining second image data of the route at the location of interest from a second optical sensor disposed onboard the vehicle system. The second image data depicts the route at the location of interest after passage of the vehicle system over the route at the location of interest. The method also includes determining whether a change in the route has occurred at the location of interest by comparing the first image data with the second image data.

In one embodiment, a system includes a controller configured to obtain first image data of a route at a location of interest from a first optical sensor disposed onboard a vehicle system moving along the route. The first image data depicts the route at the location of interest prior to passage of the vehicle system over the route at the location of interest. The controller also is configured to obtain second image data of the route at the location of interest from a second optical sensor disposed onboard the vehicle system. The second image data depicts the route at the location of interest after passage of the vehicle system over the route at the location of interest. The controller is configured to determine whether a change in the route has occurred at the location of interest by comparing the first image data with the second image data.

In one embodiment, a system includes a controller configured to examine image data of a common segment of a route obtained before and after passage of a vehicle system over the common segment of the route. The controller is configured to determine one or more differences between the image data and to determine that the common segment of the route is damaged by passage of the vehicle system based on the one or more differences that are determined.

BRIEF DESCRIPTION OF THE DRAWINGS

The subject matter described herein will be better understood from reading the following description of non-limiting embodiments, with reference to the attached drawings, wherein below:

FIG. 19 illustrates one example of a mirror translation of the image data output by the trailing sensor;

DETAILED DESCRIPTION

Figure 1:
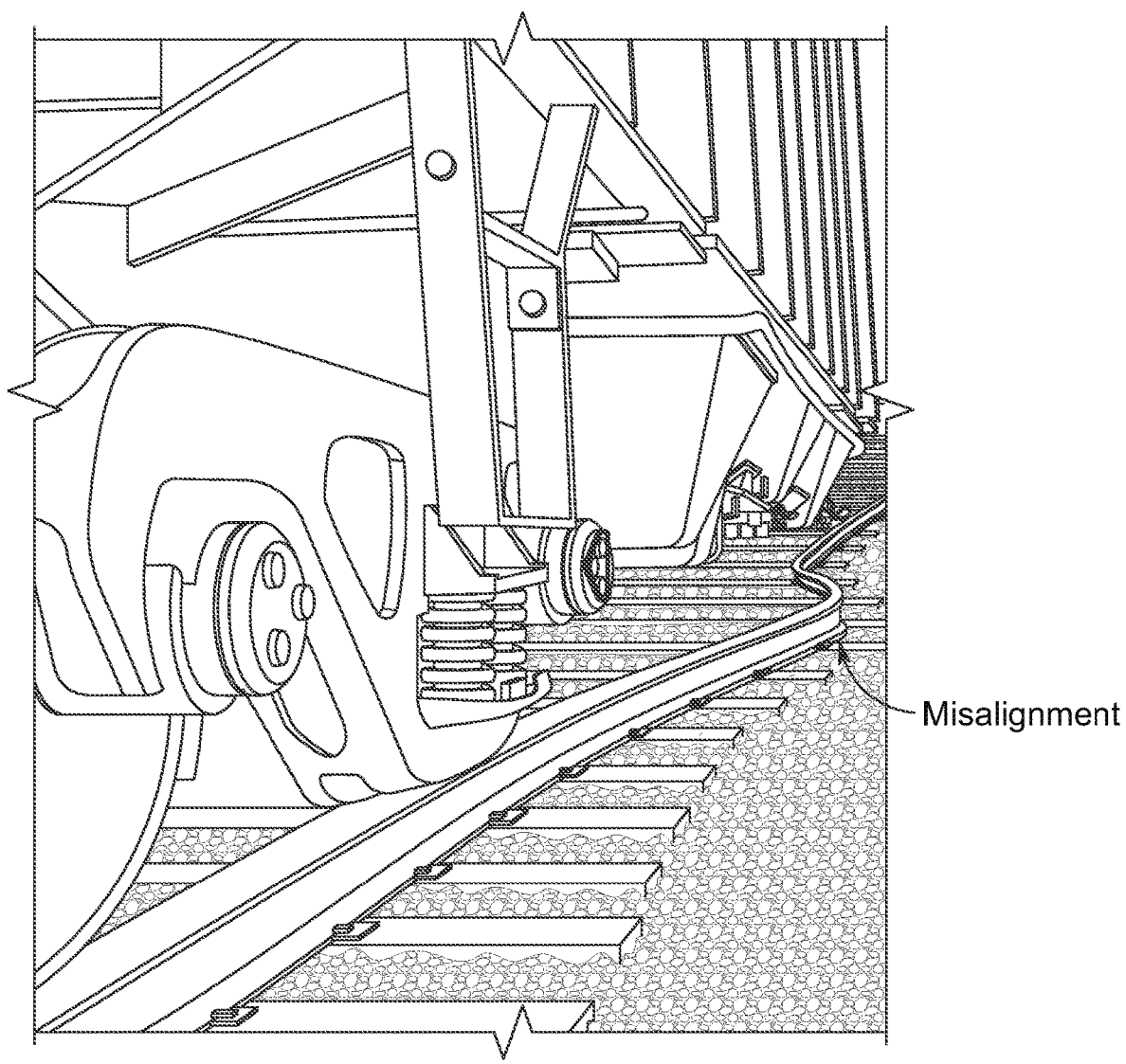
FIG. 1 illustrates one example of a thermal misalignment in a route.
Figure 2:
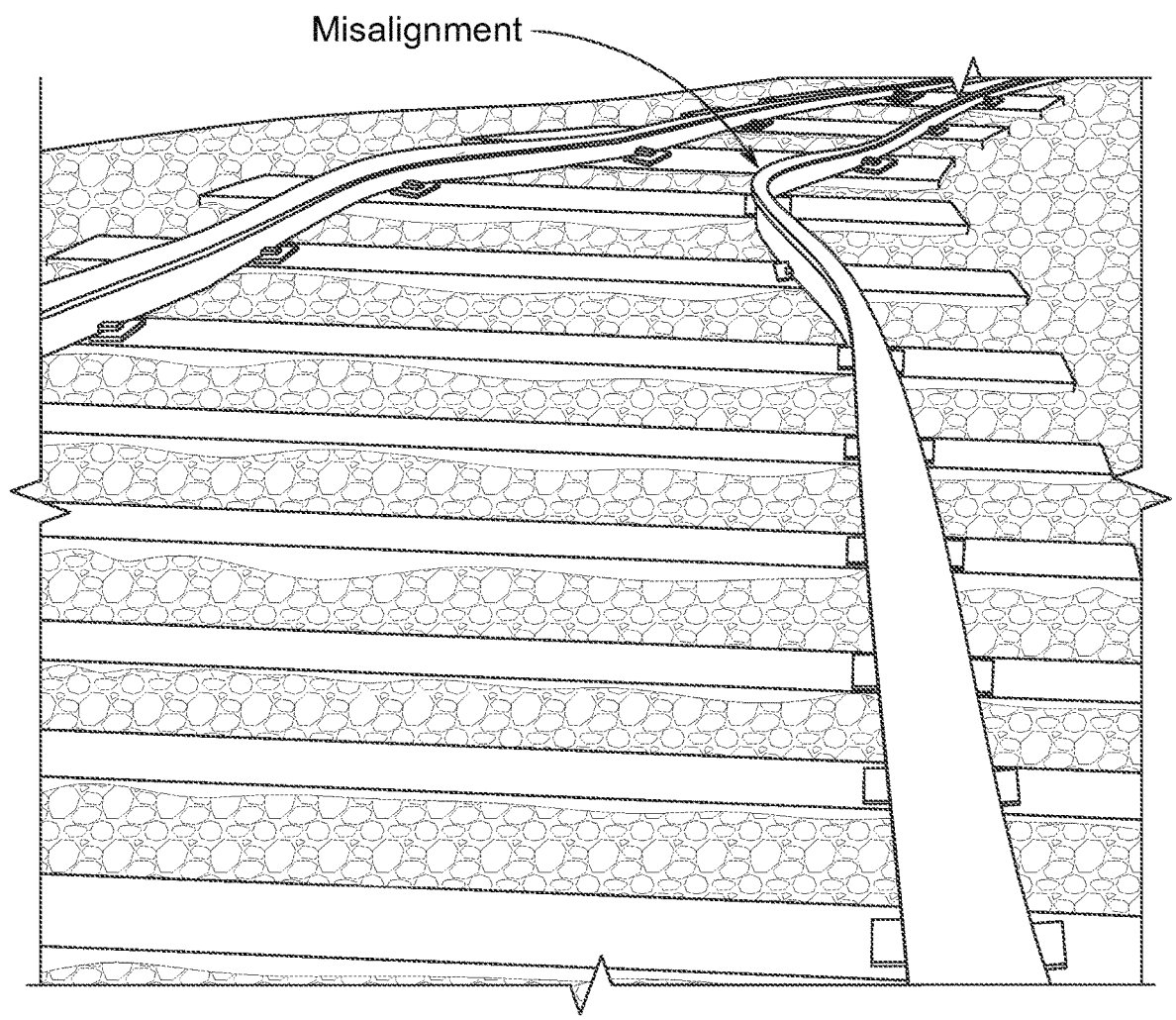
FIG. 2 illustrates another example of a thermal misalignment in a route.
Figure 3:
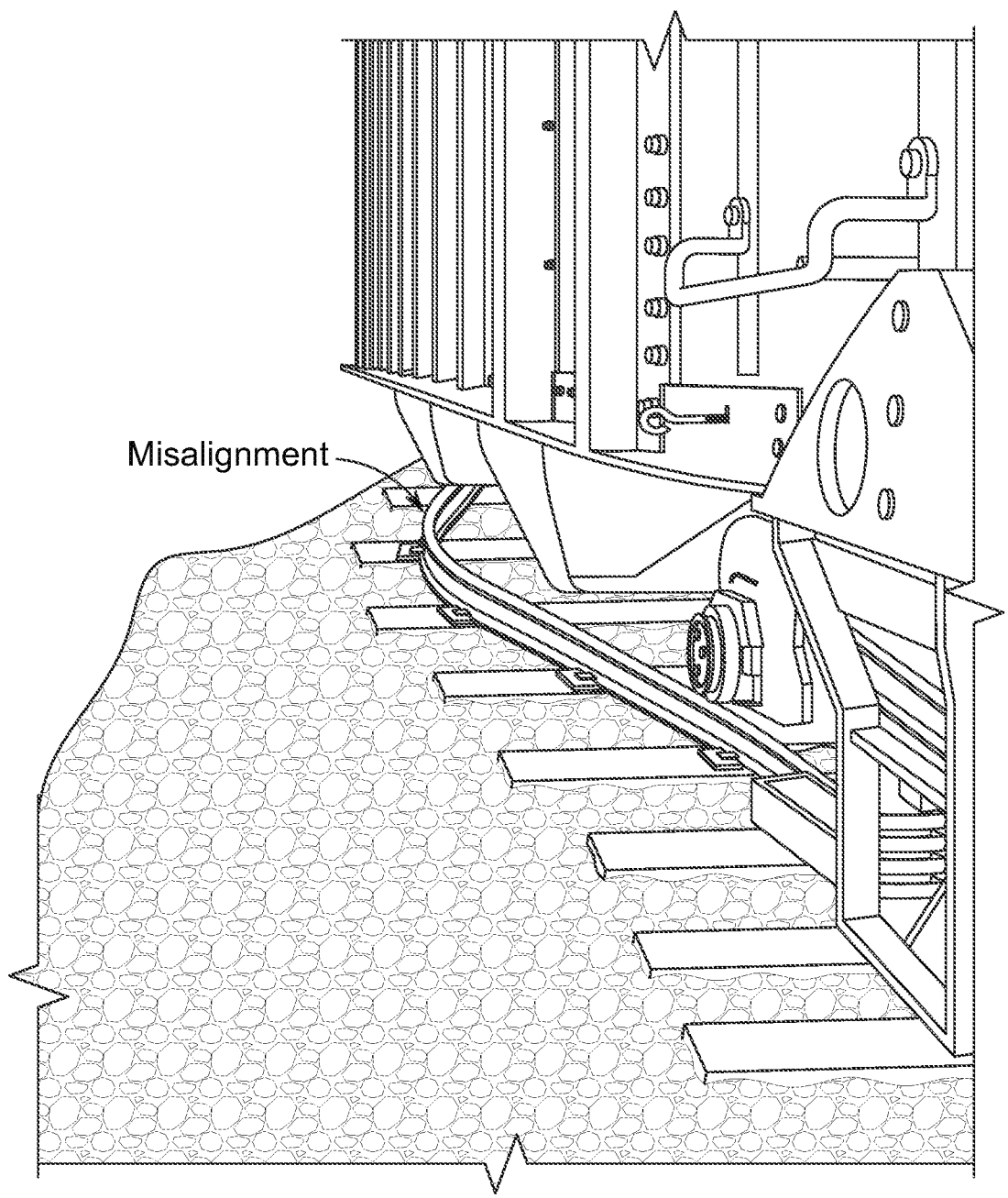
FIG. 3 illustrates another example of a thermal misalignment in a route.
Figure 4:
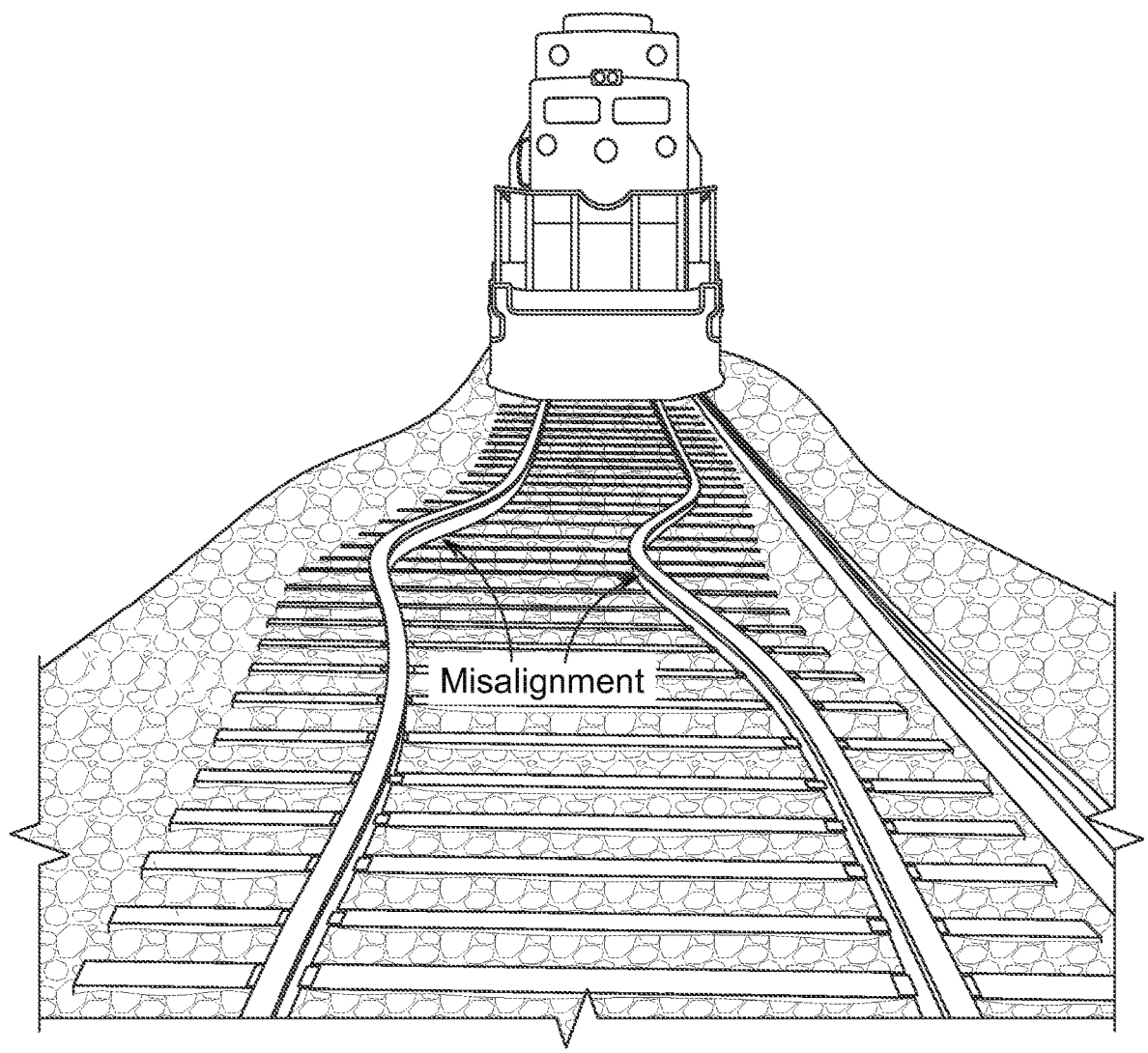
FIG. 4 illustrates another example of a thermal misalignment in a route.

One or more embodiments of the inventive subject matter described herein detect misalignments in a route being traveled by a vehicle. The misalignments may be thermal misalignments detected from a system onboard a moving vehicle. This allows the misalignments to be detected and one or more responsive actions initiated or implemented before the misalignments can present hazards to one or more vehicles subsequently traveling over the same segment of the route. One or more embodiments of the systems described herein can be disposed onboard vehicle systems formed from two or more vehicles traveling together along a route. The systems may be onboard the last trailing vehicle (e.g., along a direction of travel) for monitoring segments of the route that were recently traversed by the vehicle system. Additionally or alternatively, the systems may be onboard the first leading vehicle (e.g., along the direction of travel) for monitoring upcoming segments of the route yet to be traversed by the vehicle system (to allow responsive actions to be implemented or triggered prior to worsening the misalignment for one or more subsequent vehicle systems).

The systems described herein may monitor curvatures of a route, such as a track formed from one or more rails. While the description herein focuses on rail vehicles (e.g., locomotives, rail cars, etc.) and rail vehicle systems (e.g., trains, consists, etc.), not all embodiments are limited to rail vehicles or rail vehicle systems. One or more embodiments may be used with other vehicles or vehicle systems traveling on routes that may become misaligned, such as automobiles or mining vehicles traveling along routes that may be partially washed out or otherwise damaged, high rail vehicles, etc.

The systems can utilize sensors mounted on the moving vehicles to measure degrees of curvature (DoCs) of the route being traveled upon. In one embodiment, the DoC is a measurement of a change in trajectory of the route after transiting a section of a curve with a designated length (e.g., a chord length of 100 feet or 30.5 meters, or another distance). Optionally, an approximation of the DoC, or a scaled valued (using a different chord length) of the DoC may be measured and used.

The measured values of the DoC are used to calculate a nominal DoC of a segment of the route that was just transited by the vehicle system (referred to herein as a traveled segment), or a segment of the route about to be transited by the vehicle system (referred to herein as an upcoming segment). The nominal DoC can represent an average, moving average, zero frequency, or filtered (e.g., low pass filtered) curvature of the route. The nominal DoC can be calculated as the average or moving average of the DoCs measured (with the moving average being an average of a designated number of most recently obtained DoC measurements, such as the most recent ten measurements). Alternatively, the nominal DoC may be determined in another manner.

The nominal DoC may change at different locations along the route and/or at different times during movement of the vehicle over the route due to changes in curvature in the route (e.g., changes in radii of curvature in the route). The rate at which the nominal DoC changes (e.g., with respect to distance along the route) may be restricted. For example, legal or regulatory restrictions may limit how sharply different routes can curve in different locations, for different speed limits, etc. The systems described herein may prevent the nominal DoC from changing at a rate that is faster than a designated rate (e.g., which may be operator selected or obtained from laws or regulations). This can allow for changes in the DoC that are caused by misalignments in the route to stand out or apart from changes in the nominal DoC that are not caused by misalignments of the route.

To detect a misalignment such as a thermal misalignment, a deviation in the DoC from the nominal DoC can be calculated by subtracting the nominal DoC from an instantaneous DoC measurement. The instantaneous DoC measurement can be a single measurement of the DoC, but does not necessarily require being instantly measured with respect to time. The deviation between the instantaneous DoC and the nominal DoC can be referred to as a DoC deviation or difference. A DoC deviation that exceeds a threshold can indicate a misalignment in the route, such as a thermal misalignment. In order to detect relatively very small misalignments, the DoC deviations associated with a short length of the route (e.g. fifty feet or fifteen meters or less) may be summed together to form an accumulated DoC deviation. The accumulated DoC deviation that exceeds a designated threshold is indicative of a misalignment.

One or more technical effects of the inventive subject matter described herein is the detection of misalignments in a route during movement of a vehicle along the route, and the implementation of responsive actions in response thereto in order to ensure the safe travel of the vehicle and/or other vehicles. For example, responsive to detecting a thermal misalignment in the route, the systems described herein may direct the vehicle to automatically slow or stop movement, communicate a signal to other vehicles heading toward and/or scheduled to travel over the thermal misalignment to warn the other vehicles, communicate a signal to other vehicles heading toward and/or scheduled to travel over the thermal misalignment to automatically and remotely control the other vehicles to slow or stop movement during travel over the thermal misalignment, communicate a signal to other vehicles heading toward and/or scheduled to travel over the thermal misalignment to automatically and remotely control the other vehicles to change routes to avoid traveling over the thermal misalignment, communicate a signal to one or more route devices (e.g., switches, gates, etc.) that control where vehicles travel on the route that automatically and remotely controls the route device(s) to cause the other vehicles to travel on other routes (e.g., change a state of a switch to cause other vehicles to travel around and not over the thermal misalignment), communicate a signal to a scheduling or dispatch facility to cause the schedule of one or more other vehicles to be changed to cause the one or more other vehicles to not travel over the thermal misalignment, and/or communicate a signal to repair personnel that causes the personnel to travel to the thermal misalignment and inspect and/or repair the misalignment. These responsive actions can prevent damage to route infrastructure, prevent losses of cargo carried by the vehicles, and/or prevent a reduction of cargo or vehicular throughput along the route that could result from a derailment of the vehicles caused by the misalignment.

Figure 5:
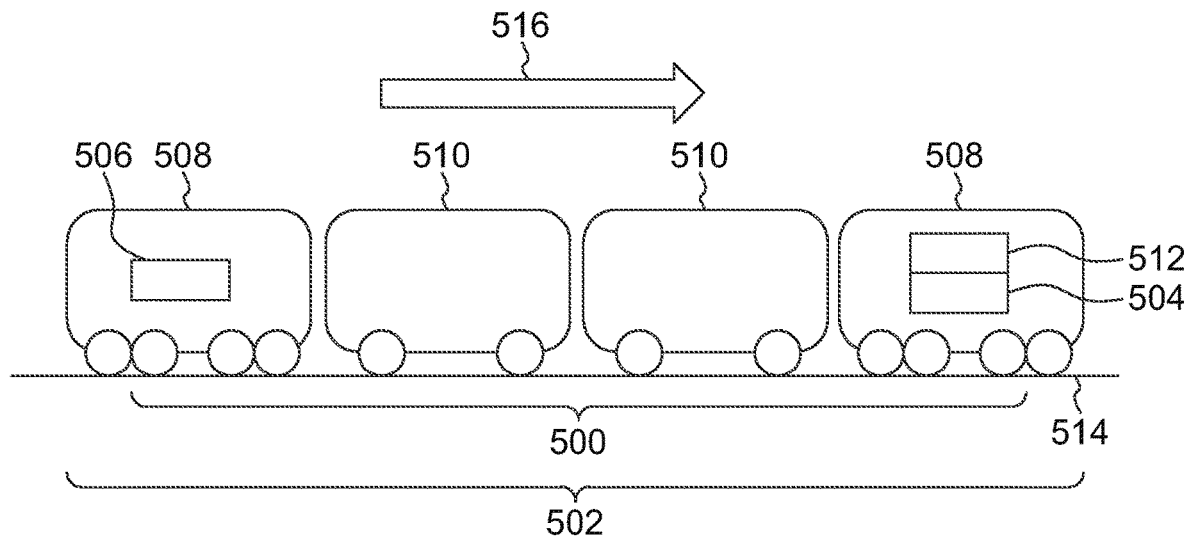
FIG. 5 illustrates one embodiment of a route inspection system disposed onboard a vehicle system.

FIG. 5 illustrates one embodiment of a route inspection system 500 disposed onboard a vehicle system 502. The route inspection system includes sensors 504, 506 disposed onboard one or more vehicles 508, 510 of the vehicle system and a monitoring system 512 (also referred to herein as a monitor) that examines data provided by the sensors to identify misalignments in a route 514 being traveled by the vehicle system. The vehicles 508 represent propulsion-generating vehicles, such as locomotives, automobiles, mining vehicles, or the like. The vehicles 510 represent non-propulsion-generating vehicles, such as rail cars, trailers, or the like. The vehicles 508, 510 in the vehicle system travel together along one or more routes. The vehicles 508, 510 may be mechanically coupled with each other. Optionally, the vehicles 508 may be logically coupled with each other without being mechanically coupled with each other. For example, the vehicles 508 may communicate with each other to coordinate movements of the vehicles 508 so that the vehicles 508, 510 travel together along the route, such as in a platoon. While the vehicle system and vehicles are shown and described herein as rail vehicle systems and rail vehicles, not all embodiments are limited to rail vehicles or rail vehicle systems. While the route may be described as a track formed from one or more rails, not all embodiments are limited to tracks or rails. For example, embodiments of the subject matter described herein may be used to detect warping, washouts, or other problems or damage to automobile routes (e.g., roads). The number and arrangement of the vehicles in the vehicle system are provided as one non-limiting example. Alternatively, the vehicle system may be formed from a different number of vehicles 508 and/or vehicles 510. In one embodiment, the vehicle system may be formed from a single vehicle 508 or 510.

The sensors may generate data representative of curvatures of the route during movement of the vehicle system along the route. The sensor 504 may be referred to as a leading sensor as the sensor 504 obtains data indicative of curvatures in segments of the route that are ahead of the vehicle system along a direction of travel or movement 516 of the vehicle system. The sensor 506 may be referred to as a trailing sensor as the sensor 506 obtains data indicative of curvatures in segments of the route that are behind the vehicle system (e.g., that the vehicle system recently traveled over) along the direction of travel or movement of the vehicle system. The route inspection systems described herein may determine DoCs of upcoming segments of routes being traveled upon and/or of segments of routes that the vehicle systems recently traveled over (e.g., behind the vehicle systems).

Figure 6:
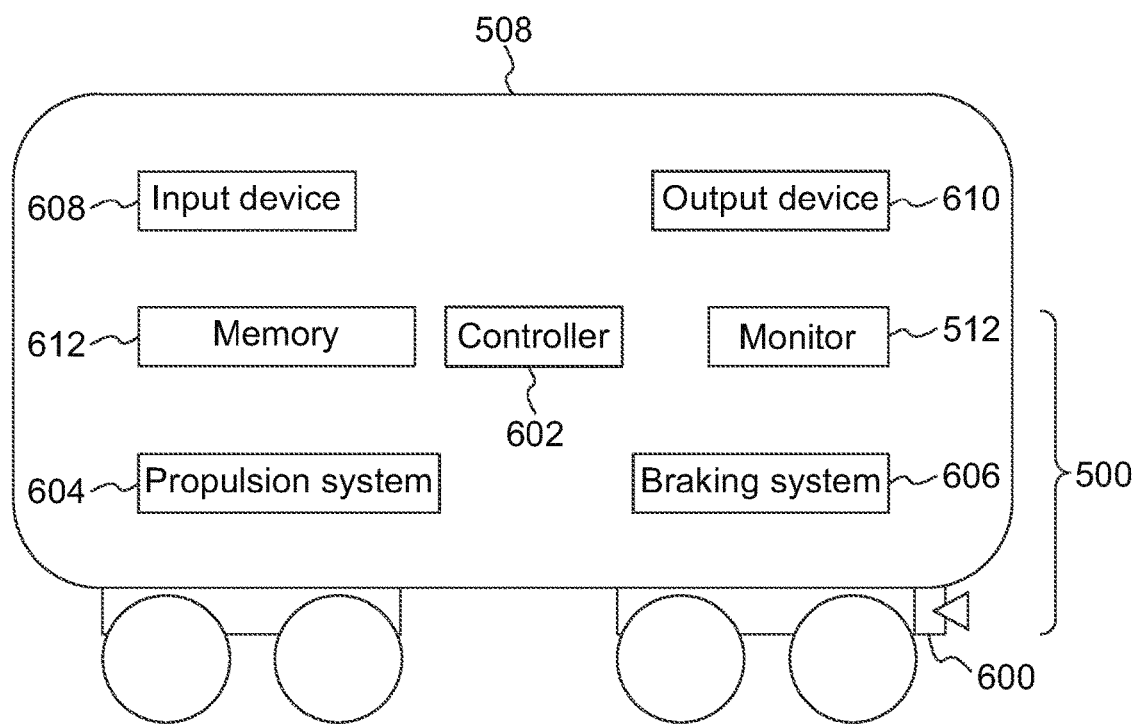
FIG. 6 illustrates one embodiment of the route inspection system shown in FIG. 5.

FIG. 6 illustrates one embodiment of the route inspection system 500 shown in FIG. 5. The route inspection system is shown as being disposed onboard a single vehicle 508 in FIG. 6, but optionally may be disposed onboard two or more vehicles. The route inspection system includes a sensor 600, which can represent the leading sensor 504 or the trailing sensor 506 shown in FIG. 5. The sensor 600 can be an optical sensor that obtains or measures information using light and generates data indicative of the information. As one example, the optical sensor can be a two or three-dimensional camera. Alternatively, the optical sensor can be a lidar sensor, a structured light sensor, infrared sensor, photo multiplied sensor (e.g., night vision sensor), white light sensor, radar sensor, spectrographic light sensor, etc.

The sensor is shown as being connected to an external surface of a truck or bogie of the vehicle, but optionally may be disposed elsewhere. For example, the sensor may be connected on a top, front, or rear surface of the vehicle and oriented toward the route such that the field of view of the sensor encompasses at least part of the route under examination. Optionally, the optical sensor may be disposed inside the vehicle, such as inside an operator cab of the vehicle, with the field of view of the sensor including at least a portion of the route under examination (e.g., via or through one or more windows or openings of the vehicle).

The monitoring system 512 receives data provided by the sensor and determines DoC in the route, nominal DoCs of the route, and DoC deviations based on or using this data. The monitoring system represents hardware circuitry that includes and/or is connected with one or more processors, such as one or more microprocessors, field programmable gate arrays, and/or integrated circuits. The arithmetic/logic unit (ALU) of one or more processors of the monitoring system can perform the calculations and comparisons described herein, and can change a state of one or more registers or flip flops to cause a buffer, such as a two- or three-state buffer, to drive outputs onto a wire indicative of the calculations or comparisons.

A controller 602 of the vehicle represents hardware circuitry that includes and/or is connected with one or more processors, such as one or more microprocessors, field programmable gate arrays, and/or integrated circuits. The controller controls operation of the vehicle, and generates signals communicated to a propulsion system 604 and/or braking system 606 of the vehicle to control movement of the vehicle. The propulsion system represents one or more engines, alternators, generators, batteries, motors, or the like, that operate to propel the vehicle along the route. The braking system represents one or more brakes, such as air brakes, friction brakes, or the like. The controller can communicate with the monitoring system and/or an input device 608 to receive instructions on how to control movement of the vehicle. The input device can represent one or more throttles, steering wheels, pedals, buttons, levers, touchscreens, keyboards, etc., that can be actuated by an operator to instruct the controller how to control movement of the vehicle. The controller can generate signals communicated to the propulsion system and/or braking system to implement the instructions received via the input device and/or monitoring system. The monitoring system can generate and communicate signals (e.g., the ALU of one or more processors of the monitoring system can change a state of one or more registers or flip flops to cause a buffer, such as a two- or three-state buffer, to drive outputs onto a wire indicative of the signals) to the controller responsive to detecting a misalignment in the route. These signals may cause the controller to automatically slow or stop movement of the vehicle.

An output device 610 represents one or more display devices, touchscreens (which may be different from or the same as the input device), speakers, lights, transceiving circuitry (e.g., modems, antennas, etc.), web enabled interfaces, web clients/servers, cloud interfaces, or the like, that visually and/or audibly notify an operator of the vehicle of misalignments in the route and/or communicate with one or more locations off-board the vehicle of the misalignment. The monitoring system can generate and communicate signals (e.g., the ALU of one or more processors of the monitoring system can change a state of one or more registers or flip flops to cause a buffer, such as a two- or three-state buffer, to drive outputs onto a wire indicative of the signals) to the output device responsive to detecting a misalignment in the route. These signals may cause the output device to notify the operator of the vehicle and/or one or more off-board locations of the misalignment.

A memory 612 represents one or more tangible and non-transitory computer readable media, such as computer hard drives, optical disks, read only memories, random access memories, or the like. The monitoring system can generate and communicate signals (e.g., the ALU of one or more processors of the monitoring system can change a state of one or more registers or flip flops to cause a buffer, such as a two- or three-state buffer, to drive outputs to an address bus for writing information to the memory) to the memory to store instantaneous DoCs, nominal DoCs, and/or DoC deviations calculated by the ALU of the monitoring system. The monitoring system can obtain the nominal DoCs and/or instantaneous DoCs used to calculate the nominal DoCs and/or DoC deviations from the memory (e.g., the ALU can obtain inputs received from one or more buffers driven by signals on a wire connected with the buffers and the memory).

Figure 7:
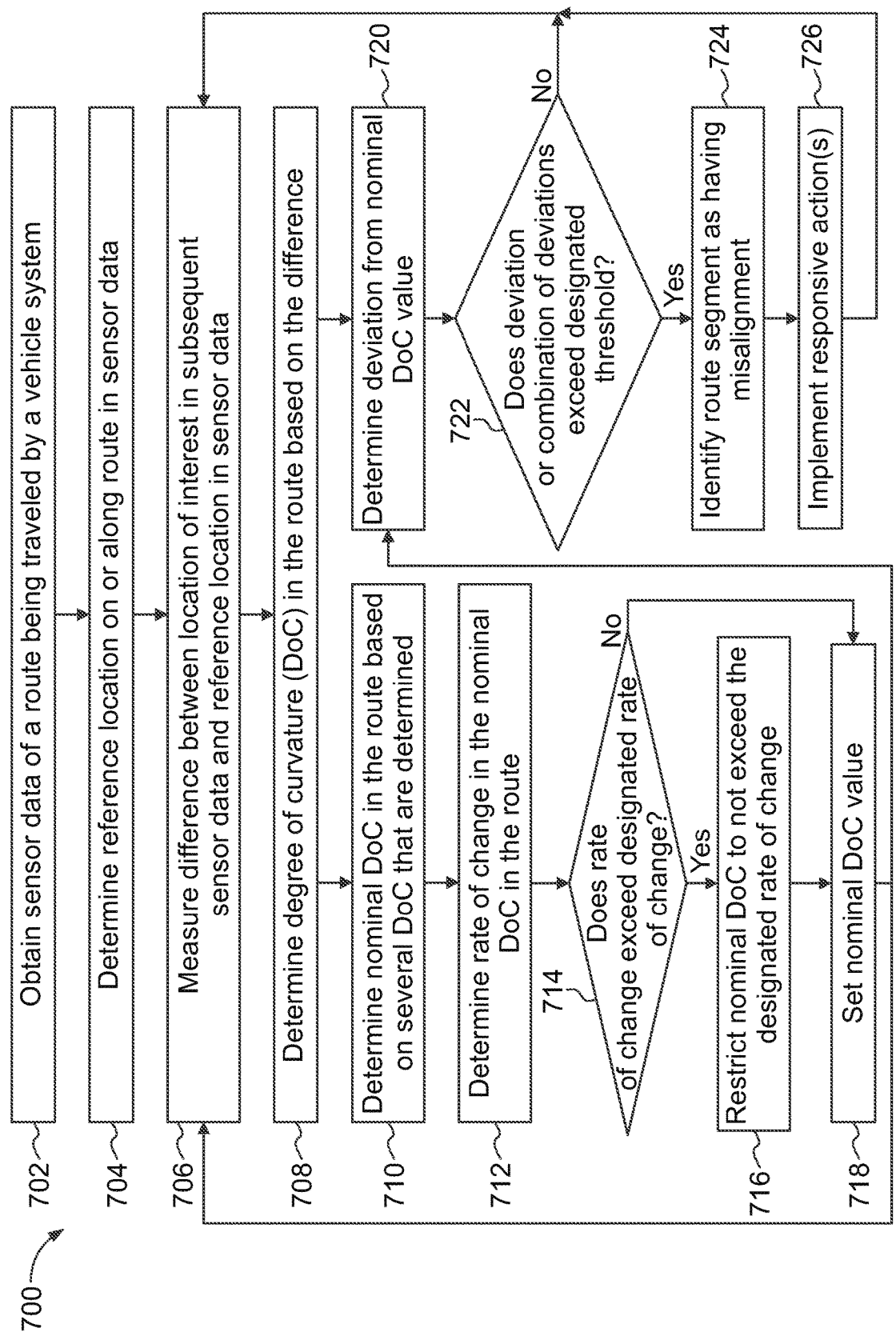
FIG. 7 illustrates a flowchart of one embodiment of a method for inspecting a route.

FIG. 7 illustrates a flowchart of one embodiment of a method 700 for inspecting a route. The method 700 may be performed by the route inspection system described herein. The data used to inspect the route can be sensed and provided to the one or more processors of the monitoring system by the sensor or sensors. The ALU of one or more processors of the monitoring system may perform the comparisons and the calculations described herein using this data. The memory can be written to and accessed by the ALU of one or more processors of the monitoring system as needed for these calculations and comparisons. The method 700 may represent software directing the operations of the monitoring system, or may represent an algorithm that is used to create such software.

At 702, sensor data of the route being traveled by the vehicle system is obtained. This sensor data can include static images, videos, frames of a video, or other optical information representative of a segment of the route recently traveled over by the vehicle system and/or an upcoming segment of the route. The sensor data may be received by the monitoring system from the sensor(s). At 704, a reference location or point in the sensor data is determined. This reference location may be referred to as a datum or a feature of interest in the route, and represents a location on the route and/or a fixed distance from the route.

Figure 8:
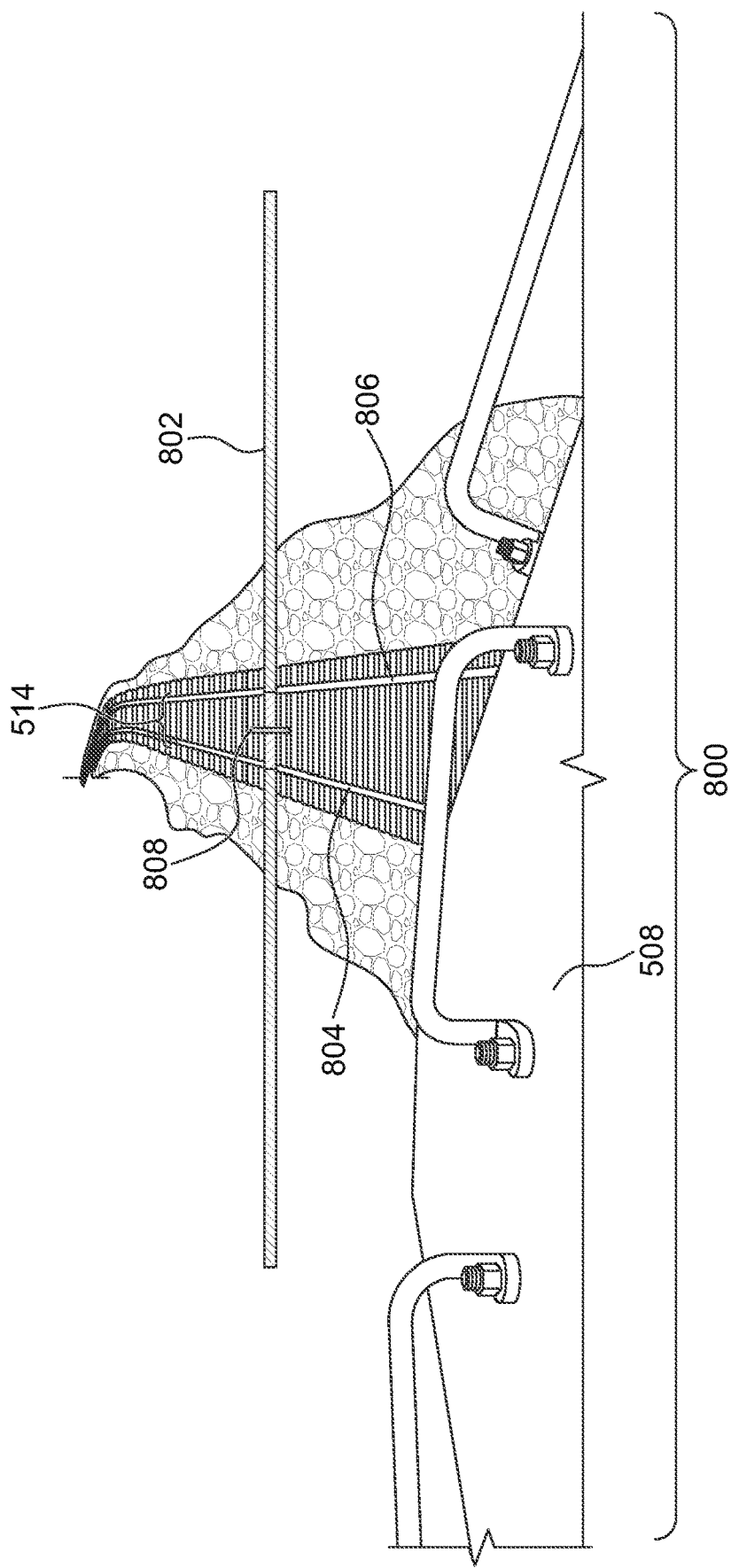
FIG. 8 illustrates one example of sensor data obtained by the route inspection system.

FIG. 8 illustrates one example of sensor data 800 obtained by the monitoring system from one or more of the sensors. The sensor data is an image or frame of a video, and shows a segment of the route. A reference line 802 indicates a designated or fixed distance away from the sensor that provided the sensor data 800 toward the route. This distance may be three meters, six meters, or another distance. In one embodiment, the monitoring system can examine pixels of the sensor data along the reference line to identify where the reference location is located in the sensor data. For example, the ALU of one or more processors in the monitoring system can compare intensities and/or chromaticities of the pixels along the reference line in order to identify locations of route features of interest 804, 806 (such as rails, painted lines on a road, etc.) of the route. The pixels representative of the rails may have intensities and/or chromaticities that are within a designated range of each other (e.g., values within 5%, 10%, or 20% of each other), while pixels representative of other objects in the sensor data may have intensities and/or chromaticities that are outside of this range. By comparing the intensities and/or chromaticities, the ALU of one or more processors in the monitoring system can determine which pixels are indicative of the features of interest in the route. Optionally, aspects of the sensor data other than pixels may be examined. For example, sensors such as infrared sensors, photo multiplied sensors (e.g., night vision sensors), white light sensors, lidar sensors, radar sensors, spectrographic light sensors, etc., may have other aspects or features other than pixels that are examined. These other sensors may output sensor data such as volts or amps (from an analog-to-digital converter), DB or DBmv radio output, light intensities (e.g., in lumens per foot or lux per foot), etc.

The monitoring system may select a reference location 808 in the sensor data along the reference line during travel on a straight section of the route. As described below, locations in subsequently acquired sensor data are compared to this reference location to determine the DoC of segments of the route. The reference location may be calculated by one or more ALUs of the monitoring system as an intersection of a location in the route with the reference line 802. In one embodiment, the reference location is the midway point between the features of interest, such as the center of the route (as shown in FIG. 8), along the reference line. Alternatively, the reference location may be an intersection between an inner or outer edge of the features of interest and the reference line.

Returning to the description of the method 700 shown in FIG. 7, at 706, one or more locations of interest in subsequent sensor data are determined. The monitoring system may examine multiple images or video frames of the sensor data representative of later times and/or different locations along the route to identify locations of interest. The locations of interest that are identified may be the same relative location on the route, but may be located elsewhere in the subsequent sensor data (different than the sensor data used to identify where the reference location is located) due to curvature of the route. The monitoring system can compare the locations of interest with the reference location to determine differences between these locations. These differences can be indicative of curvature of the route.

Figure 9:
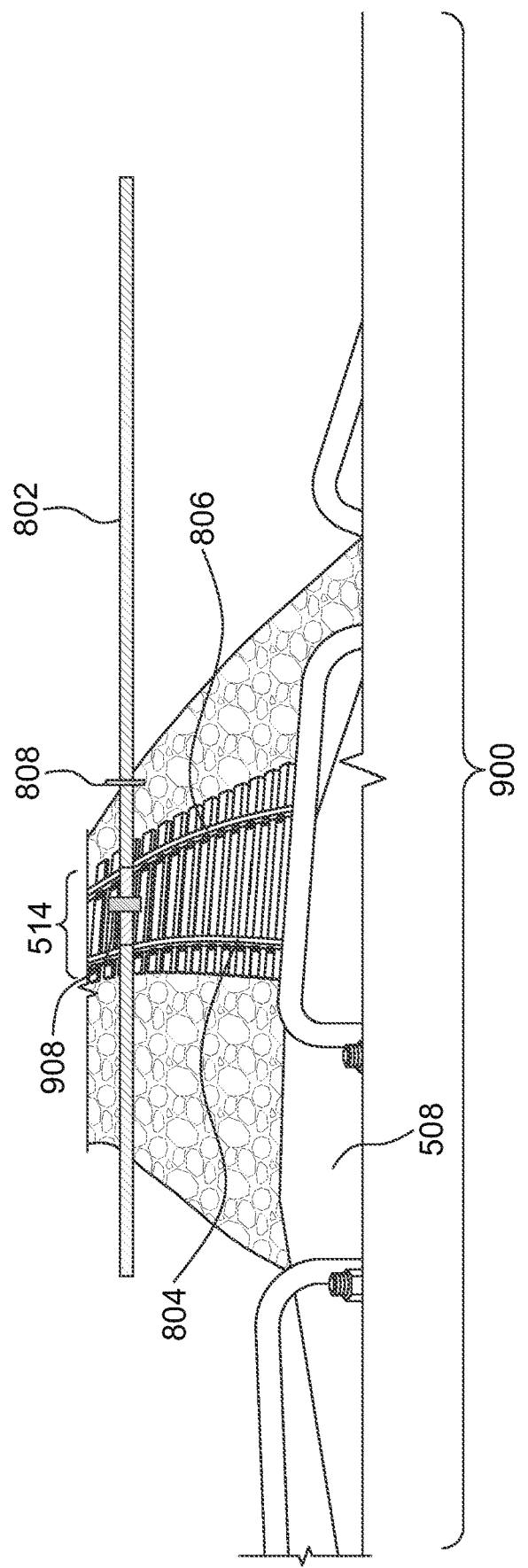
FIG. 9 illustrates another example of sensor data obtained by the route inspection system.

FIG. 9 illustrates another example of sensor data 900 obtained by the monitoring system from one or more of the sensors. The sensor data 900 may be an image or video frame representative of the route at a time or location subsequent to the sensor data 800 shown in FIG. 8. The monitoring system examines the sensor data 900 in a similar manner to as described above in connection with the sensor data 800 shown in FIG. 8 to identify a location of interest 908 in the sensor data 900. For example, the monitoring system can examine the sensor data 900 to find the midpoint between the rails 804, 806 of the route 514 as the location of interest 908.

As shown in FIGS. 8 and 9, the location of interest 908 in the sensor data has moved (e.g., to the left in the perspective of FIGS. 8 and 9) away from the location of the reference location 808 in the sensor data. This movement or change in the reference location indicates that the route is curving. The DoC of the route (e.g., the instantaneous DoC of the route) can be determined based on this change in the reference location.

Figure 10:
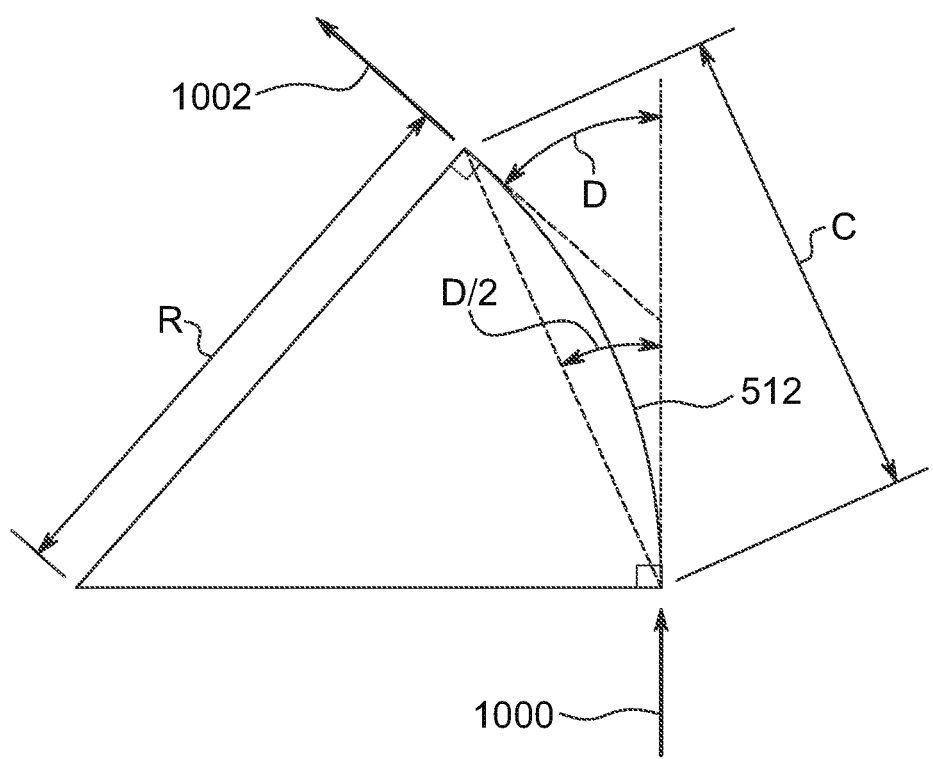
FIG. 10 schematically illustrates calculation of an instantaneous degree of curvature (DoC) of a route according to one example.

Returning to the description of the method 700 shown in FIG. 7, at 708, an instantaneous DoC in the route is determined based on the difference between the location of interest and the reference location. FIG. 10 schematically illustrates calculation of an instantaneous DoC of a route according to one example. The DoC represents a difference in trajectory (or heading or path of the route) after traveling along an arc of a chord length C. The chord length can be selected by an operator of the monitoring system or may have a default value, such as 100 feet or 30.5 meters, or another distance. The larger that this difference is between the trajectories, the sharper the curve is in the route. The smaller this difference is, the more gradual the curve is in the route.

For example, a DoC can be expressed as or can represent an angular difference D between a previous trajectory 1000 and a subsequent trajectory 1002. A radius of curvature R of the segment of the route can be calculated based on the difference D in trajectories as follows:

$$R = \frac{C}{2\sin\frac{D}{2}}$$

As the difference in trajectories D becomes larger (e.g., closer to ninety or 270 degrees), the radius of curvature R becomes smaller. But, the monitoring system may not be able to calculate the DoC directly from the sensor data. Instead, the monitoring system may use differences or changes in the reference location in the sensor data to approximate or estimate the DoC of the route.

Figure 11:
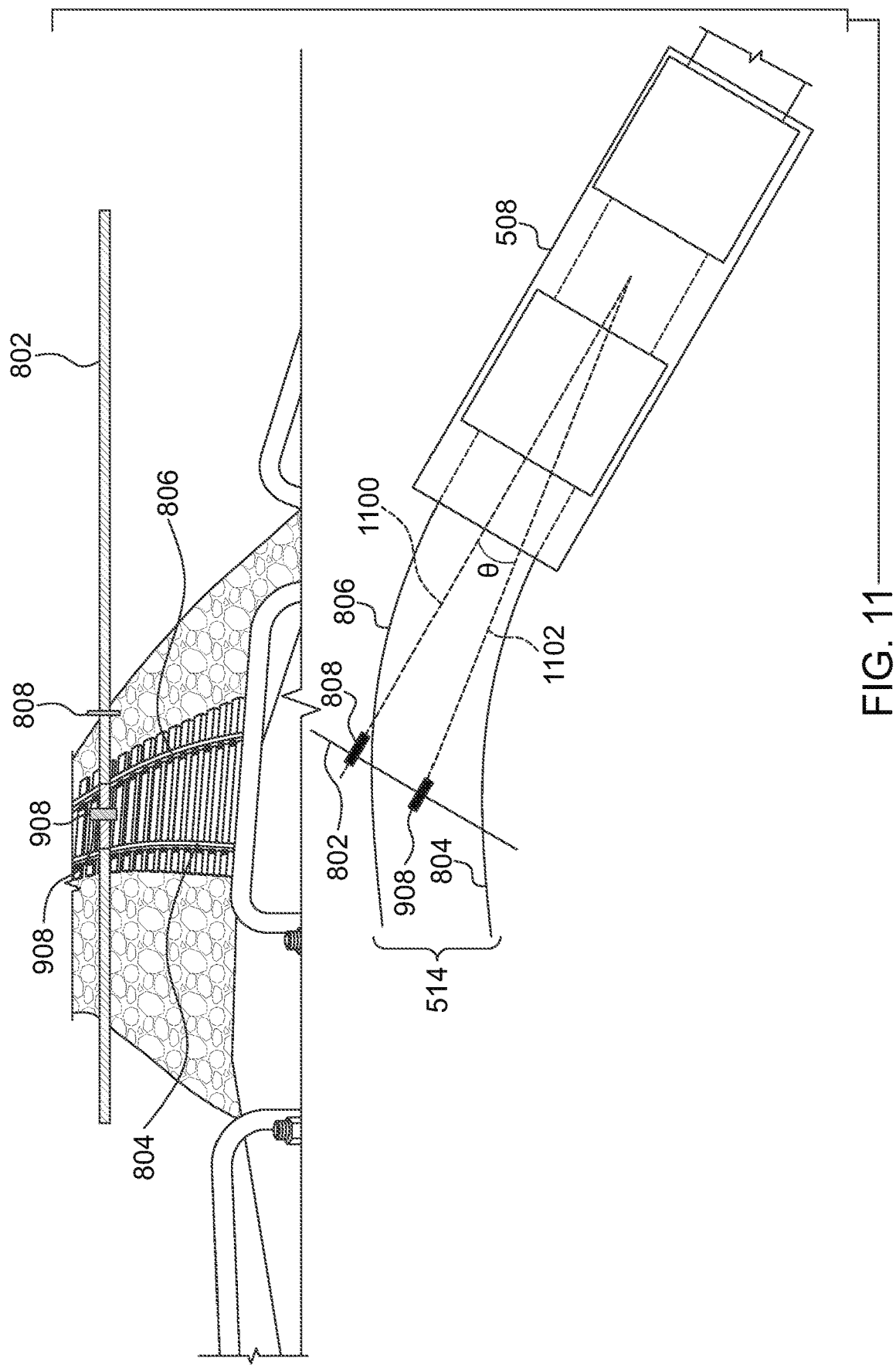
FIG. 11 schematically illustrates a top view of a vehicle shown in FIG. 5 during travel on a route.

FIG. 11 schematically illustrates a top view of the vehicle 508 during travel on the route 514 and the sensor data 900 shown in FIG. 9. Also shown in FIG. 11, the location of interest 908 along the route 514 has moved away from the reference location 808, which indicates that the route is curving. One or more ALUs of the processors in the monitoring system can compare the locations of the location of interest and the reference location in the sensor data to determine how far the location of interest is from the reference location. A theta angle Θ represents the angular difference or angle between a straight reference line 1100 extending to the reference location 808 and a straight examination line 1102 to the location of interest 908.

Figure 12:
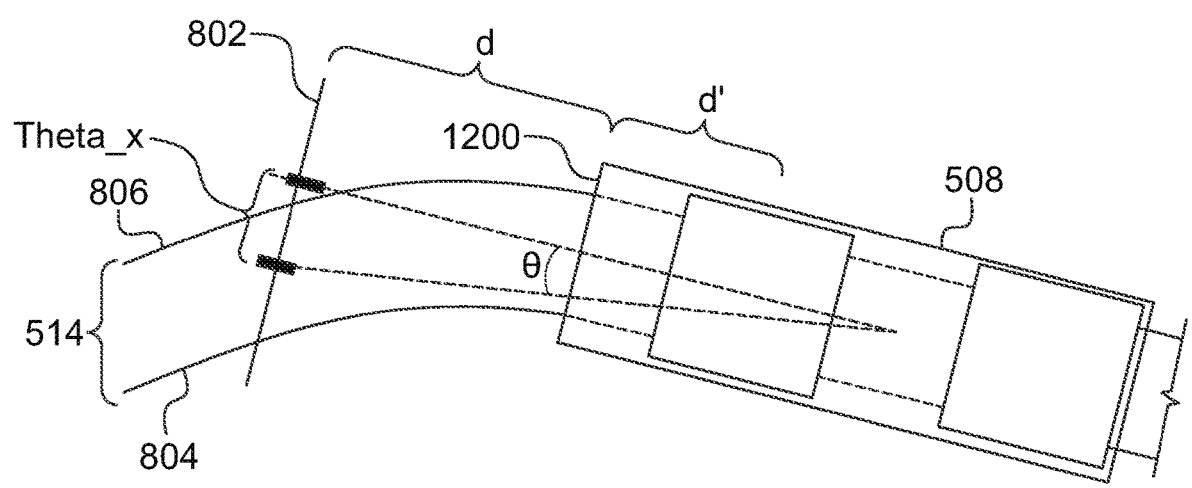
FIG. 12 schematically illustrates another top view of the vehicle according to the example shown in FIG. 11.

FIG. 12 schematically illustrates another top view of the vehicle 508 according to the example shown in FIG. 11. The monitoring system (e.g., the ALU of one or more processors of the monitoring system) can calculate a distance between the location of interest 908 in the sensor data 900 and the reference location 808 in the sensor data 800 to determine a DoC of the route. This distance is referred to as a $theta_x$ distance, as shown in FIG. 12. This $theta_x$ distance and a separation distance (d+d') from the sensor 600 to the fixed distance from the sensor 600 (e.g., the reference line 802) form a right angle, which forms a right triangle, as shown in FIG. 12. The $theta_x$ distance may be measured in units of pixels or other units within the sensor data by the monitoring system (e.g., the ALU of one or more processors of the monitoring system). The monitoring system (e.g., the ALU of one or more processors of the monitoring system) may then convert this pixel distance by multiplying this pixel distance (or number of pixels) by a scaling factor that converts the pixel distance to another distance (e.g., inches, centimeters, etc.).

In one embodiment, the separation distance (d+d') is a combination (e.g., sum) of a distance (d') from halfway between the front and rear trucks of the vehicle (e.g., trucks of a locomotive) to an outer end 1200 of the vehicle and a distance (d) from an outer end 1200 of the vehicle to the location of the reference line. Because the sensor does not move with respect to the vehicle and the reference line represents a fixed location relative to the sensor and/or outer end of the vehicle, the separation distance is a fixed distance in one embodiment.

Figure 13:
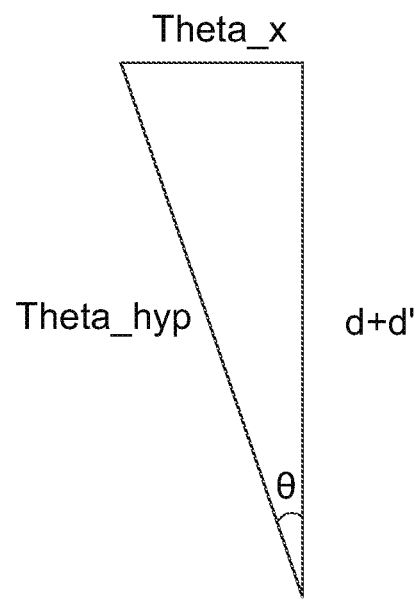
FIG. 13 illustrates a relationship between a separation distance between a sensor of the route inspection system and a reference line and a $theta_x$ distance according to one example.
Figure 14:
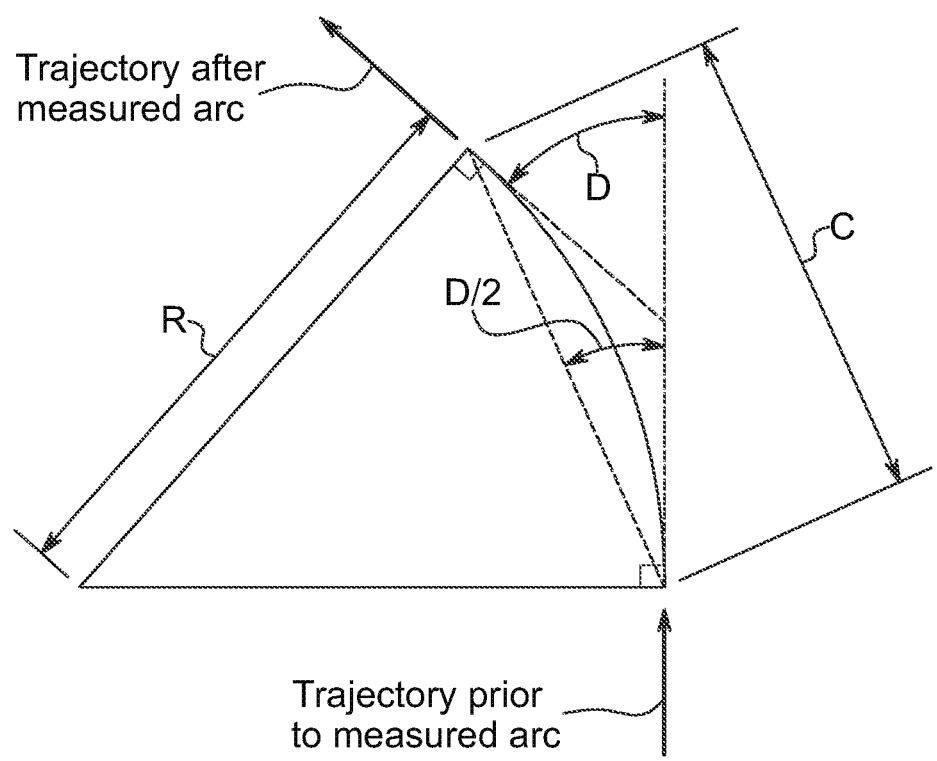
FIG. 14 also illustrates the relationship between the separation distance and the $theta_x$ distance.

FIGS. 13 and 14 illustrate relationships between the separation distance (between the sensor 600 and the reference line 802) and the $theta_x$ distance according to one example. Theta (θ) is the angle measured by the sensor using a chord length of $theta_{hyp}$. $theta_{hyp}$ and θ can be used to calculate D for a chord length C. The value of $theta_{hyp}$ varies based on the value of θ:

$$theta_{hyp} = \frac{theta_x}{\sin\theta}$$

The radius of curvature R of the route can be determined as follows:

$$R = \frac{chordlength}{2\sin(angle)}$$

This radius can be determined from the values of the chord length (C) and the value of D:

$$R = \frac{C}{2\sin\frac{D}{2}}$$

The chord length C can have a fixed value (e.g., 100 feet) in one embodiment.

Optionally, the radius of curvature R can be calculated from $theta_{hyp}$ and θ:

$$R = \frac{theta_{hyp}}{2\sin\theta}$$

where $theta_{hyp}$ is a variable chord length.

This relationship can be used to convert θ and $theta_{hyp}$ into the DoC (e.g., D) by setting the equations equal to each other:

$$\frac{C}{2\sin\frac{D}{2}} = \frac{theta_{hyp}}{2\sin\theta}$$

The value of the DoC (e.g., D in FIG. 14) can be determined as follows:

$$D = 2\sin^{-1}\frac{C\sin^2\theta}{theta_x}$$

If the value of the chord length C is known to the monitoring system (e.g., a default value is used, such as 100 feet or 1200 inches, and is accessible by the ALU in the memory via the address bus), then the instantaneous DoC can be calculated as:

$$D = 2\sin^{-1}\frac{1200\sin^2\theta}{theta_x}$$

Returning to the description of the method 700 shown in FIG. 7, the method 700 can include two sets of operations performed concurrently, simultaneously, or sequentially. A first set of operations (e.g., 710 through 718) is performed to determine and update the nominal DoC of the route being traveled upon and a second set of operations (e.g., 720 through 726) is performed to compare the instantaneous DoC with the nominal DoC to determine whether a misalignment in the route is detected.

At 710, the nominal DoC of the route is determined. The nominal DoC may be calculated by the monitoring system (e.g., the ALU of one or more processors) obtaining previous measurements of the instantaneous DoC (e.g., from the memory) and calculating a moving average in one embodiment. For example, the monitoring system may calculate an average of the ten, twenty, fifty, or the like, most recently calculated instantaneous DoCs as the nominal DoC. Optionally, the monitoring system may use another calculation, such as an average of the instantaneous DoCs determined during travel on a curved portion of the route.

At 712, a rate in change in the nominal DoC is determined. The nominal DoC may change as the vehicle moves along the route due to the curvature in the route not being the same along the entirety of the route. Several nominal DoCs may be determined (e.g., at 710) and stored in the memory. The monitoring system (e.g., the ALU of one or more processors) may access the memory and examine how quickly the nominal DoCs are changing with respect to distance along the route.

At 714, a determination is made as to whether the nominal DoC is changing at a rate that exceeds a designated rate of change. The curvature in a route may be limited by legal and/or regulatory restrictions to prohibit the route from curving too sharply (and thereby introducing a significant safety risk). As one example, 37 C.F.R. § 213 may set forth restrictions on the geometric of a rail track, which can include limitations on the curvature of the track.

The monitoring system (e.g., the ALU of one or more processors) may compare the rate of change in the nominal DoC (e.g., determined at 712) with a designated rate of change stored in the memory (e.g., which the ALUs may access via the address bus of the processor(s) of the monitoring system). The designated rate of change may be dictated by one or more laws or regulations, or may be input by an operator (e.g., via the input device).

If the rate of change in the nominal DoC exceeds the designated rate of change, then the nominal DoC is changing too rapidly (e.g., relative to distance along the route) and may need to be limited to provide meaningful analysis. For example, the rapid rate of change in the nominal DoC may be indicative of a thermal misalignment occurring over a relatively long portion of the route instead of a sharp curve in the route. To avoid the rapid rate of change in the nominal DoC from being incorrectly identified as the curvature in the route without any misalignment, flow of the method 700 may proceed toward 716 in order to limit the nominal DoC change.

But, if the rate of change in the nominal DoC does not exceed the designated rate of change, then the nominal DoC is not changing too rapidly and may be used for detection of misalignments in the route. As a result, flow of the method 700 may proceed toward 718.

At 716, the value of the nominal DoC is restricted (e.g., changed or prevented from changing) so that the rate of change in the nominal DoC does not exceed the designated rate of change. For example, if a current value of the nominal DoC (e.g., determined at 710) would cause the rate of change in the DoC to exceed the designated rate of change, then the monitoring system (e.g., the ALU of one or more processors) may reduce the rate of change by changing the value of the nominal DoC. The monitoring system may iteratively reduce the nominal DoC by increasingly larger values until the monitoring system calculates that the rate of change in the nominal DoC (with the reduced value) no longer exceeds the designated rate of change. The monitoring system may then use this reduced value of the nominal DoC, as described below. The ALU of one or more processors may write this reduced value to the memory (e.g., via the address bus of the one or more processors).

At 718, the value of the nominal DoC is set. If the monitoring system did not need to adjust the value of the nominal DoC at 714 and 716, then the value of the nominal DoC may be set (e.g., stored in the memory via the address bus of one or more processors of the monitoring system) as the value calculated at 710. But, if the monitoring system did adjust the value of the nominal DoC at 714 and 716 (e.g., to prevent the rate of change in the nominal DoC from being too large), then the value of the nominal DoC may be set (e.g., stored in the memory via the address bus of one or more processors of the monitoring system) as the value determined at 716.

Flow of this portion of the method 700 may then return toward 706. For example, after setting the value of the nominal DoC, another instantaneous DoC may be determined, the nominal DoC updated using this additional instantaneous DoC, and the rate of change in the nominal DoC examined to determine whether to restrict the value of the DoC, as described above. This process may be repeated several times to keep updating the nominal DoC.

With respect to the set of operations in the method 700 at 720 through 726, at 720, a deviation from the nominal DoC is determined. For example, the instantaneous DoC determined at 708 may be compared with the nominal DoC to determine a difference between the instantaneous DoC and the nominal DoC. The monitoring system (e.g., the ALU of one or more processors in the monitoring system) may calculate this difference by subtracting the nominal DoC from the instantaneous DoC (or by subtracting the instantaneous DoC from the nominal DoC). The difference may represent the DoC deviation that is determined at 720.

At 722, a determination is made as to whether the DoC deviation exceeds a designated threshold. The monitoring system (e.g., the ALU of one or more processors in the monitoring system) can compare the DoC deviation to a designated threshold that may be stored in the memory. The designated threshold may have a non-zero value to prevent small deviations from incorrectly being identified as misalignments in the route. The designated threshold may have a value that is set by an operator (e.g., via the input device). If the DoC deviation exceeds the threshold, then the deviation may indicate a misalignment in the route. As a result, flow of the method 700 can proceed toward 724. Alternatively, if the DoC deviation does not exceed the threshold, then the deviation may not indicate a misalignment in the route. As a result, flow of the method 700 can return toward 706 to repeat the determination and examination of another instantaneous DoC.

In another embodiment, the monitoring system may compare several DoC deviations to the designated threshold. The monitoring system (e.g., the ALU of one or more processors) may sum a designated number of DoC deviations (e.g., the most recent ten, twenty, etc., of the DoC deviations) to calculate a summed DoC deviation. If the summed DoC deviation exceeds the threshold, then the deviations may indicate a misalignment in the route. As a result, flow of the method 700 can proceed toward 724. Alternatively, if the summed DoC deviation does not exceed the threshold, then the summed deviation may not indicate a misalignment in the route. As a result, flow of the method 700 can return toward 706 to repeat the determination and examination of another instantaneous DoC.

As another example, the monitoring system (e.g., the ALU of one or more processors) may calculate an average (or moving average) of a designated number of DoC deviations (e.g., the most recent ten, twenty, etc., of the DoC deviations) to calculate an averaged DoC deviation. If the averaged DoC deviation exceeds the threshold, then the deviations may indicate a misalignment in the route. As a result, flow of the method 700 can proceed toward 724. Alternatively, if the averaged DoC deviation does not exceed the threshold, then the averaged deviation may not indicate a misalignment in the route. As a result, flow of the method 700 can return toward 706 to repeat the determination and examination of another instantaneous DoC.

At 724, the segment of the route is identified as having a misalignment. For example, the portion of the route from which the instantaneous DoC or several instantaneous DoCs that were measured and that resulted in the monitoring system identifying the DoC deviation, summed DoC deviation, and/or averaged DoC deviation as being indicative of a misalignment may be identified as having a misalignment. The monitoring system (e.g., the ALU of one or more processors) may store data or a datum in the memory that represents the misalignment and/or a location of the misalignment along the route. The location of the misalignment along the route may be provided by the input device, which optionally can include a global positioning system, dead reckoning system, or other location determining system (e.g., a tachometer that measures speed of the vehicle and a clock that measures passage of time to allow the location of the vehicle along the route to be calculated).

At 726, one or more responsive actions are implemented. One or more of these actions may be performed in response to identifying the misalignment. For example, the monitoring system (e.g., the ALU of one or more processors) may generate and communicate a signal to the controller to direct the vehicle to automatically slow or stop movement. Optionally, the monitoring system may generate and communicate a signal to the output device to direct the output device to communicate a signal to other vehicles heading toward and/or scheduled to travel over the thermal misalignment to warn the other vehicles. Additionally or alternatively, the monitoring system may generate and communicate a signal to the output device to direct the output device to communicate a signal to other vehicles heading toward and/or scheduled to travel over the thermal misalignment to automatically and remotely control the other vehicles to slow or stop movement during travel over the thermal misalignment.

As another example, the monitoring system may generate and communicate a signal to the output device to direct the output device to communicate a signal to other vehicles heading toward and/or scheduled to travel over the thermal misalignment to automatically and remotely control the other vehicles to change routes to avoid traveling over the thermal misalignment. Optionally, the monitoring system may generate and communicate a signal to the output device to direct the output device to communicate a signal to one or more route devices (e.g., switches, gates, etc.) that control where vehicles travel on the route that automatically and remotely controls the route device(s) to cause the other vehicles to travel on other routes (e.g., change a state of a switch to cause other vehicles to travel around and not over the thermal misalignment).

The monitoring system may generate and communicate a signal to the output device to direct the output device to communicate a signal to a scheduling or dispatch facility to cause the schedule of one or more other vehicles to be changed to cause the one or more other vehicles to not travel over the thermal misalignment. Optionally, the monitoring system may generate and communicate a signal to the output device to direct the output device to communicate a signal to repair personnel that causes the personnel to travel to the thermal misalignment and inspect and/or repair the misalignment.

In one embodiment, a system (e.g., a route inspection system) includes one or more processors configured to identify a reference location in sensor data provided by one or more sensors onboard a vehicle system. The reference location is identified along a route being traveled by the vehicle system. The one or more processors also are configured to identify a location of interest in subsequent sensor data provided by the one or more sensors. The location of interest identified along the route being traveled by the vehicle system. The one or more processors also are configured to determine a degree of curvature in the route based on a difference between the reference location and the location of interest.

In one example, the one or more sensors include one or more of a camera or a lidar sensor.

In one example, the sensor data and the subsequent sensor data include one or more of images, a video, or video frames of the route.

In one example, the one or more sensors include an optical sensor oriented toward the route along a direction of travel of the vehicle system.

In one example, the one or more sensors include an optical sensor oriented toward the route in a direction that is opposite a direction of travel of the vehicle system.

In one example, the one or more processors are configured to identify the reference location by identifying an intersection between a location on the route and a reference line in the sensor data, the reference line representing a fixed distance from the one or more sensors.

In one example, the one or more processors are configured to identify the location of interest by identifying an intersection between the location on the route used to determine the reference location and a reference line in the sensor data.

In one example, the difference between the reference location and the location of interest represents a change in trajectory of the route at different locations of the one or more sensors along the route.

In one example, the one or more processors also are configured to determine a nominal degree of curvature of the route based on the degree of curvature that is determined.

In one example, the one or more processors are configured to determine the degree of curvature of the route one or more additional times. The nominal degree of curvature is determined as a moving average of the degrees of curvature that are determined.

In one example, the one or more processors are configured to determine a rate of change in the nominal degree of curvature, compare the rate of change that is determined to a designated threshold, and change a value of the nominal degree of curvature responsive to the rate of change exceeding the designated threshold.

In one example, the one or more processors are configured to identify a misalignment in the route based on the degree of curvature that is determined.

In one example, the misalignment is a thermal misalignment of a conductive portion of the route.

In one example, the one or more processors are configured to determine a deviation of the degree of curvature from the nominal degree of curvature. The misalignment is determined based on the deviation.

In one example, the one or more processors are configured to determine the misalignment responsive to the deviation exceeding a designated threshold.

In one example, the one or more processors are configured to determine the misalignment responsive to a sum of the deviation and one or more previously determined deviations exceeding a designated threshold.

In one example, the one or more processors are configured to determine the misalignment responsive to an average of the deviation and one or more previously determined deviations exceeding a designated threshold.

In one example, the one or more processors are configured to implement one or more responsive actions responsive to determining the misalignment in the route.

In one example, the one or more responsive actions is one or more of automatically slowing or stopping movement of the vehicle system, communicating a warning signal to another vehicle traveling toward the misalignment in the route, communicating the warning signal to another vehicle scheduled to travel toward the misalignment in the route, remotely controlling movement of another vehicle traveling toward the misalignment to alter the movement of the other vehicle, remotely controlling a switch in the route to prevent another vehicle from traveling over the misalignment, and/or communicating a signal to a repair facility to direct repair of the route at the misalignment.

In one embodiment, a method (e.g., for inspecting a route) includes identifying a reference location in sensor data provided by one or more sensors onboard a vehicle system. The reference location is identified along a route being traveled by the vehicle system. The method also includes identifying a location of interest in subsequent sensor data provided by the one or more sensors. The location of interest is identified along the route being traveled by the vehicle system. The method also includes determining a degree of curvature in the route based on a difference between the reference location and the location of interest.

In one example, the sensor data and the subsequent sensor data include one or more of images, a video, or video frames of the route.

In one example, the one or more sensors include a sensor oriented toward the route along a direction of travel of the vehicle system.

In one example, the one or more sensors include a sensor oriented toward the route in a direction that is opposite a direction of travel of the vehicle system.

In one example, identifying the reference location includes identifying an intersection between a location on the route and a reference line in the sensor data, the reference line representing a fixed distance from the one or more sensors.

In one example, identifying the location of interest includes identifying an intersection between the location on the route used to determine the reference location and a reference line in the sensor data.

In one example, the difference between the reference location and the location of interest represents a change in trajectory of the route at different locations of the one or more sensors along the route.

In one example, the method also includes determining a nominal degree of curvature of the route based on the degree of curvature that is determined.

In one example, the method also includes determining the degree of curvature of the route one or more additional times, where the nominal degree of curvature is determined as a moving average of the degrees of curvature that are determined.

In one example, the method also includes determining a rate of change in the nominal degree of curvature, comparing the rate of change that is determined to a designated threshold, and changing a value of the nominal degree of curvature responsive to the rate of change exceeding the designated threshold.

In one example, the method also includes determining a misalignment in the route based on the degree of curvature that is determined.

In one example, the misalignment is a thermal misalignment of a conductive portion of the route.

In one example, the method also includes determining a deviation of the degree of curvature from the nominal degree of curvature, where the misalignment is determined based on the deviation.

In one example, the misalignment is determined responsive to the deviation exceeding a designated threshold.

In one example, the misalignment is determined responsive to a sum of the deviation and one or more previously determined deviations exceeding a designated threshold.

In one example, the misalignment is determined responsive to an average of the deviation and one or more previously determined deviations exceeding a designated threshold.

In one example, the method also includes implementing one or more responsive actions responsive to determining the misalignment in the route.

In one example, the one or more responsive actions is one or more of automatically slowing or stopping movement of the vehicle system, communicating a warning signal to another vehicle traveling toward the misalignment in the route, communicating the warning signal to another vehicle scheduled to travel toward the misalignment in the route, remotely controlling movement of another vehicle traveling toward the misalignment to alter the movement of the other vehicle, remotely controlling a switch in the route to prevent another vehicle from traveling over the misalignment, and/or communicating a signal to a repair facility to direct repair of the route at the misalignment.

The inventive subject matter described herein also can inspect a route for changes to the route at a location after a vehicle system travels over the location. For example, the inspection systems described herein can examine the route at a location of interest from onboard the vehicle system before and after the vehicle system moves over the location of interest. Based on differences between before and after the vehicle system moves over the location of interest, the inspection system can determine if the condition or state of the route has changed. For example, the inspection systems can determine whether passage of the vehicle system has bent a rail in the route, formed or enlarged a pothole in a road, failed to fully clean up debris in the route (where the vehicle system is equipped to clean debris from the route), formed ruts or other indentations in the route, etc. In one example, the inspection system and method can obtain image data (e.g., one or more images, videos, video frames, etc.) of a location of interest in the route before the vehicle system having the inspection system onboard moves over or through the location of interest. The inspection system and method can obtain additional image data of the same location of interest in the route after the vehicle system moves over or through the location of interest. The image data from prior to vehicle system passage over the location of interest and after vehicle system passage over the location of interest can be compared with each other to identify any changes in the state or condition of the route at the location of interest due to passage of the vehicle system.

While some embodiments of the subject matter described herein are described in connection with rail vehicles, not all embodiments of the inventive subject matter are limited to rail vehicles traveling on tracks formed from one or more rails. For example, one or more embodiments of the inspection systems and methods described herein can be used in connection with automobiles, buses, trucks, or the like, to determine whether passage of the vehicles over a route created or enlarged a pothole, crack, or other damage; whether passage of a street-cleaning or street-sweeping vehicle fully cleaned debris from the street or left some debris in the street; whether passage of a mining vehicle, agricultural vehicle, or other vehicle traveling on a non-paved route formed ruts or other indentations in the route from passage over the route; and the like.

Figure 15:
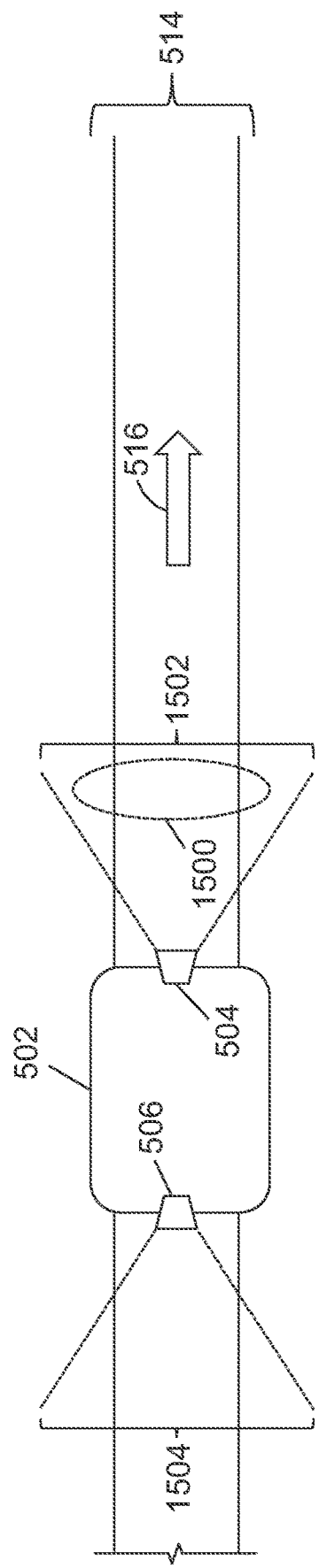
FIG. 15 illustrates another example of the vehicle system shown in FIG. 5 traveling on the route also shown in FIG. 5 prior to moving over a location of interest in the route.
Figure 16:
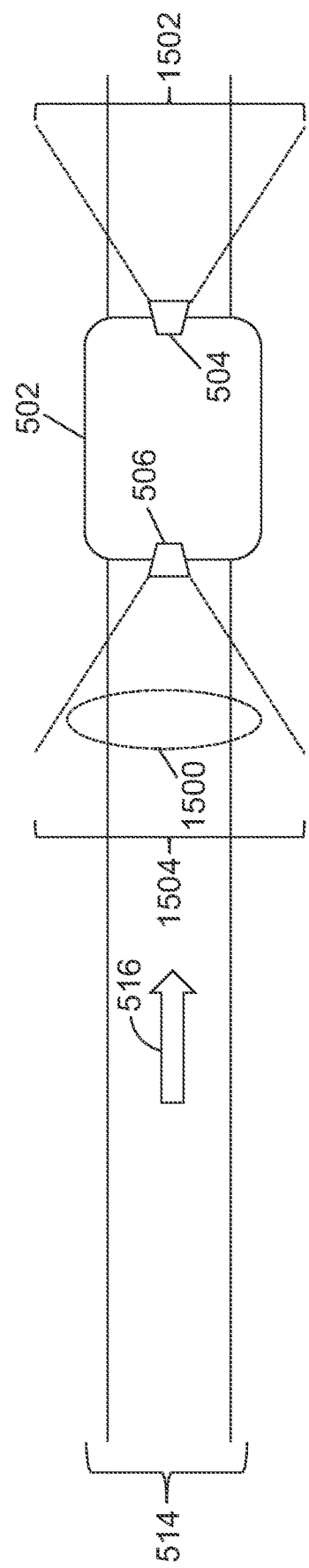
FIG. 16 illustrates the vehicle system shown traveling on the route after moving over the location of interest in the route.

FIG. 15 illustrates another example of the vehicle system 502 traveling on the route 514 prior to moving over a location of interest 1500 in the route 514. FIG. 16 illustrates the vehicle system 502 traveling on the route 514 after moving over the location of interest 1500 in the route 514. As described above in connection with FIGS. 5 and 6, the inspection system can include a leading sensor 504 and a trailing sensor 506 relative to a direction of movement 516 of the vehicle system. Each of these sensors can be an optical sensor. While these leading and trailing sensors are shown as being disposed on different vehicles of the vehicle system in FIG. 5, alternatively, the leading and trailing sensors may be disposed onboard a single vehicle (e.g., where the vehicle system is formed from a single vehicle), as shown in FIG. 15.

Each of the leading and trailing sensors can have a field of view, which represents the areas or volumes captured or represented by data output by the sensors. For example, the leading sensor can be a camera, LiDAR system, infrared camera, other type of infrared sensor, or the like, having a forward field of view 1502. The field of view of the leading sensor can be referred to as a leading field of view as this field of view is ahead of the vehicle system. Data output by the leading sensor (e.g., images and/or videos) can represent objects, events, etc., located ahead of the vehicle system along the direction of movement of the vehicle system. The trailing sensor can be a camera, LiDAR system, infrared camera, other type of infrared sensor, or the like, having a rearward field of view 1504. The field of view of the trailing sensor can be referred to as a rearward field of view as this field of view is behind of the vehicle system. Data output by the trailing sensor (e.g., images and/or videos) can represent objects, events, etc., located behind the vehicle system along the direction of movement of the vehicle system.

In operation, the controller of the inspection system obtains image data of the route from the leading sensor as the vehicle system moves along the route. This image data can depict a segment of the route prior to passage of the vehicle system over the segment of the route. The controller also can obtain image data of the route from the trailing sensor as the vehicle system moves along the route. After the vehicle system moves over a segment previously captured in the image data output by the leading sensor, the image data output by the trailing sensor can represent the same segment of the route but in the field of view of the trailing sensor.

The controller can compare the image data output by the leading and trailing sensors to determine whether a change in the route has occurred. For example, the controller can determine whether a shape or other appearance of the route at the same location (e.g., a location of interest) in the image data from the leading sensor has changed in the image data from the trailing sensor. A change in the image data may indicate that the state or condition of the route has changed due (at least in part) to movement of the vehicle system over the location in the route.

Figure 18:
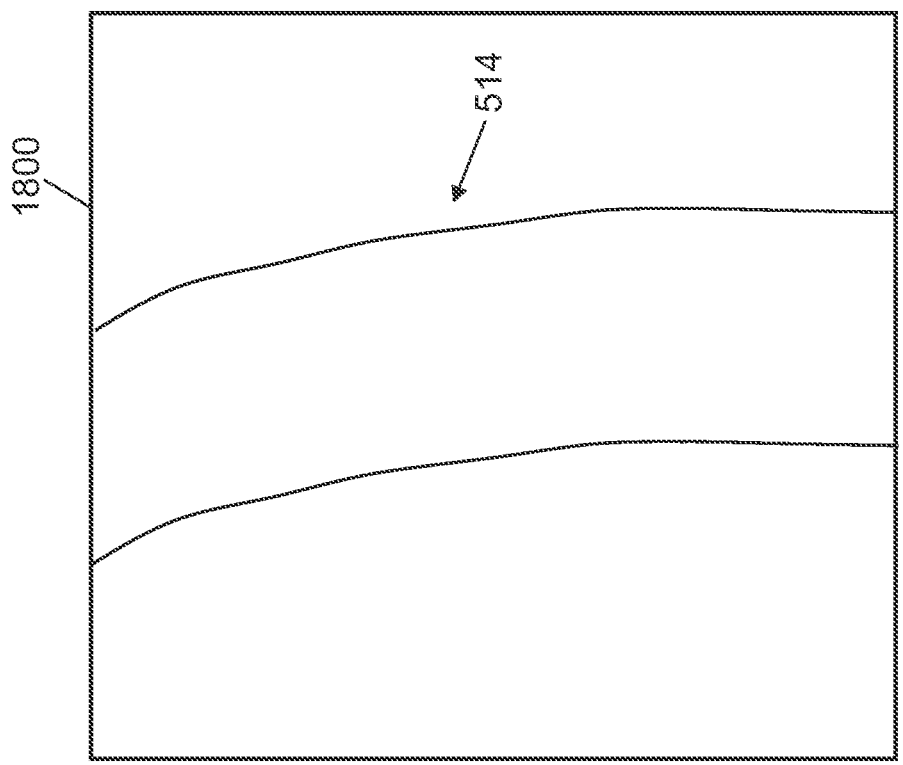
FIG. 18 illustrates one example of image data output by a trailing sensor shown in FIG. 5.
Figure 17:
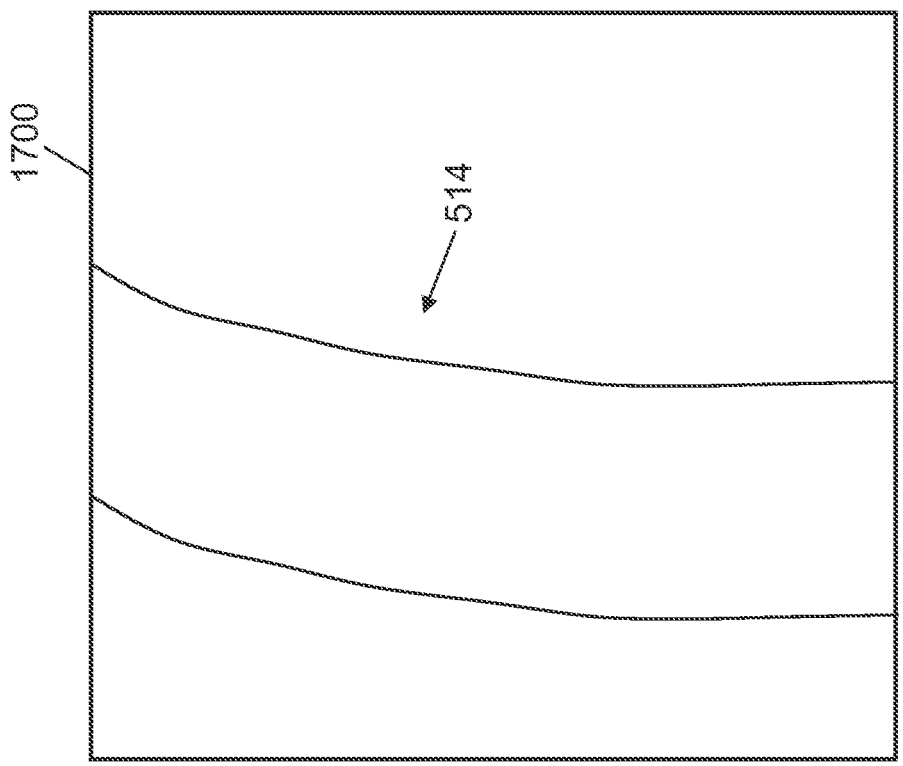
FIG. 17 illustrates one example of image data output by a leading sensor shown in FIG. 5.

FIG. 17 illustrates one example of image data 1700 output by the leading sensor 504 and FIG. 18 illustrates one example of image data 1800 output by the trailing sensor 506. The image data 1700, 1800 each show the same segment of the route 514 from different viewpoints. For example, the image data 1700 can represent the segment of the route in the field of view of the leading sensor as the vehicle system approaches the segment of the route. The image data 1800 can represent the same segment of the route in the field of view of the trailing sensor. As a result, the image data 1700, 1800 can be mirror images of each other (or approximate mirror images of each other, subject to changes in the route caused at least in part by passage of the vehicle system).

The controller can compare the image data from the leading and trailing sensors to determine whether the state or condition of the route within the segment changed upon travel of the vehicle system over or through the segment. For example, the controller can perform a translation of the image data provided by one of the leading or trailing sensor to create a mirror image version of the image data. FIG. 19 illustrates one example of a mirror translation 1900 of the image data 1800 output by the trailing sensor. The controller can create the mirror translation by flipping or otherwise moving pixels or other sub-parts of the image data 1800 about or across an axis, such as the left edge of the image data 1800.

The controller can then compare the image data from the leading and trailing sensors, such as by identifying differences between the image data from the leading sensor and the mirror image of the image data from the trailing sensor, identifying differences between the image data from the trailing sensor and the mirror image of the image data from the leading sensor, by overlaying the image data from one sensor onto the mirror image of the image data from the other sensor, by overlaying the mirror image of the image data from one sensor onto the image data from the other sensor, and the like. In the illustrated example, the route appears the same (or nearly the same as) in the image data from the leading sensor as the mirror image data of the trailing sensor. This can indicate that the state or condition of the route has not changed from movement of the vehicle system over the same segment of the route.

Figure 21:
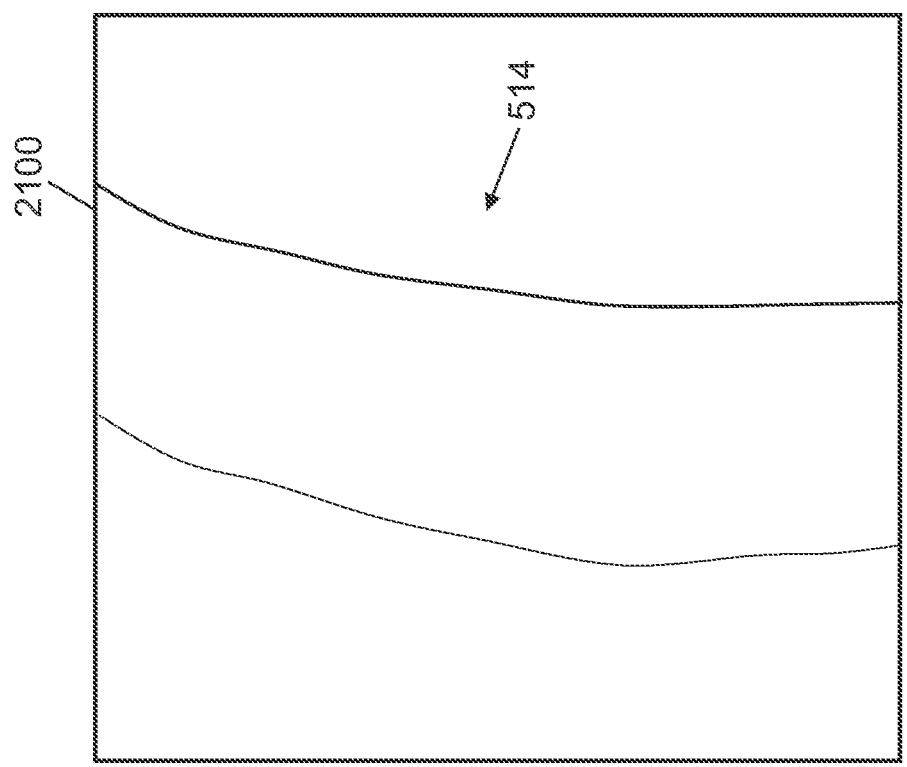
FIG. 21 illustrates a mirror translation of the image data shown in FIG. 20.
Figure 20:
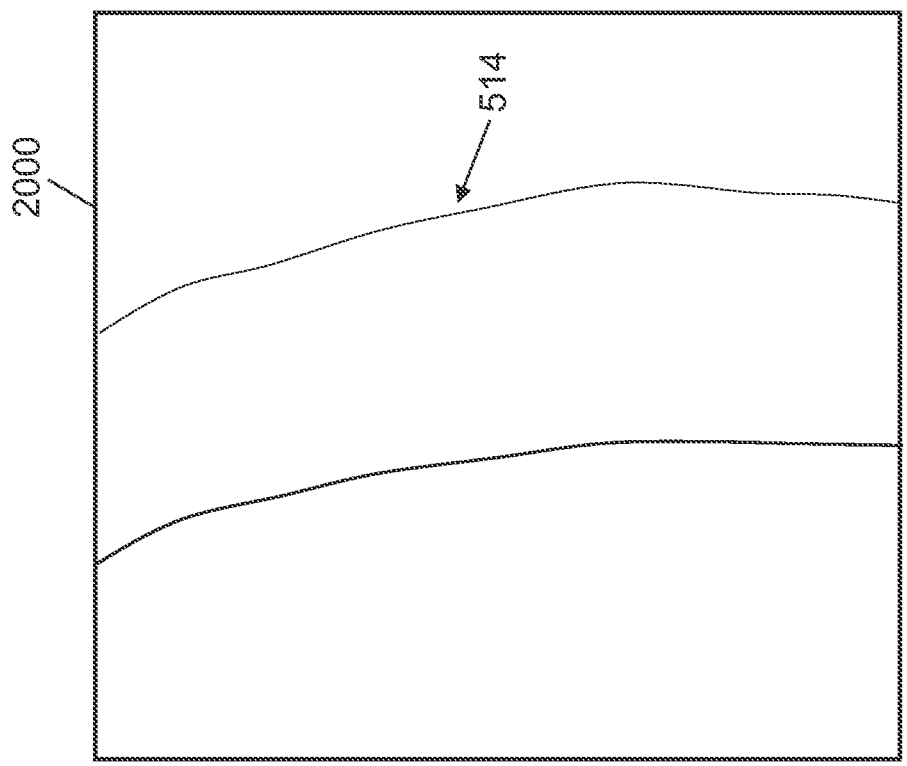
FIG. 20 illustrates another example of image data that may be output by the trailing sensor after the vehicle system has traveled over the segment of the route depicted in the image data output by the leading sensor shown in FIG. 17.

FIG. 20 illustrates another example of image data 2000 that may be output by the trailing sensor 506 after the vehicle system has traveled over the segment of the route depicted in the image data 1700 output by the leading sensor. FIG. 21 illustrates a mirror translation 2100 of the image data 2000 shown in FIG. 20. As described above, the controller can compare the image data 1700 from the leading sensor with the mirror translation 2100 of the image data 2000 from the trailing sensor to identify changes in the route. Alternatively, the controller can compare the image data 2000 from the trailing sensor with a mirror translation of the image data 1700 from the leading sensor to identify changes in the route.

Figure 22:
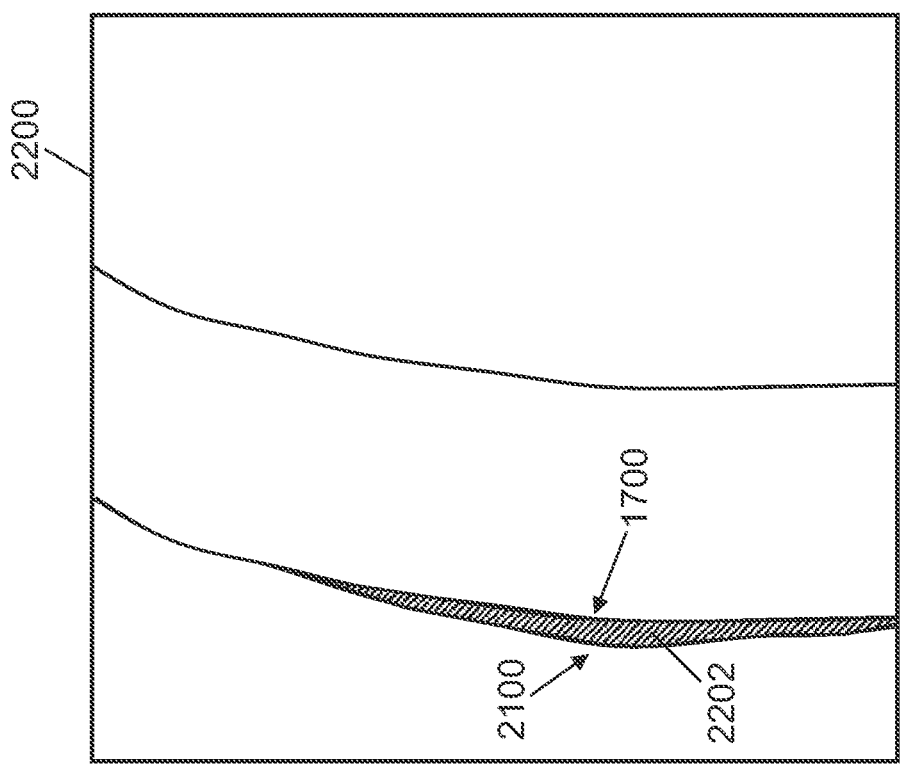
FIG. 22 illustrates an overlay of the mirror translation of the image data shown in FIG. 21 onto the image data shown in FIG. 17.

FIG. 22 illustrates an overlay 2200 of the mirror translation 2100 of the image data 2000 from the trailing sensor onto the image data 1700 from the leading sensor. The controller can examine the image data and/or mirror translation to identify differences 2102 between the image data and the mirror translation. These differences indicate a change in the route, such as an outward bend in one rail of the route. Alternatively, the differences can indicate the formation or expansion of a rut, pothole, crack, or indentation in the route; debris that was not removed from the route (e.g., an uncleaned area of the route); or the like.

The controller may use machine learning to identify the changes in the route. For example, the controller may repeatedly identify locations where a change is detected and locations where a change is not detected. Information input into the controller (e.g., by an operator or route personnel) can confirm or refute whether a change occurred at one or more of these locations. Based on the accuracy or inaccuracy of the controller in identifying where the changes actually occurred and where the controller accurately and/or inaccurately identified changes, the controller can learn over time how to better identify changes in the route. Alternatively, the controller may use one or more other techniques to determine whether the route has changed or has been modified as described herein.

The location where the change in the route is identified can be referred to as a location of interest in the route. Responsive to detecting or identifying a change in the state of the route at such a location of interest, the controller can implement or perform one or more responsive actions. As one example, the controller can communicate an advisory signal to one or more off-board locations.

In one embodiment, the output device 610 shown in FIG. 6 can represent or include a communication device that communicates with the off-board locations. This output device can include transceiving circuitry and associated hardware, such as modems, antennas, or the like. The controller can direct the output device to wirelessly communicate (e.g., broadcast and/or transmit) the advisory signal responsive to detecting the change in the route from the image data before and after the vehicle system traveled over the route. This advisory signal can be communicated to an off-board protection or safety system that communicates with several vehicle systems to restrict where and/or when the vehicle systems are permitted to travel. For example, the advisory signal can be communicated to a positive protection system that communicates positive signals to vehicle systems traveling within an area associated with the positive protection system. These positive signals indicate that a vehicle system can enter into an upcoming segment of a route. If a controller onboard the vehicle system does not receive a positive signal from the protection system for an upcoming segment of the route, then the controller may prevent the vehicle system from entering into the upcoming segment. For example, the controller can automatically control the propulsion system from propelling the vehicle system into the upcoming segment, automatically control the brake system to stop the vehicle system from entering into the upcoming segment, automatically steer the vehicle system in a direction that prevents the vehicle system from entering into the upcoming segment, etc. Alternatively, the controller of the vehicle system can prevent the vehicle system from entering into an upcoming segment unless a positive signal is received by preventing commands input by the operator of the vehicle system from controlling the propulsion system and/or brake system from moving the vehicle system into the upcoming segment (unless and/or until the positive signal is received). One example of such a positive control system is a positive train control system.

The protection system may be a negative protection system that communicates negative signals to vehicle systems. These signals are communicated to indicate that a vehicle system cannot enter into an upcoming segment of a route. If a controller onboard the vehicle system does not receive a negative signal from the protection system for an upcoming segment of the route, then the controller allows the vehicle system to enter into the upcoming segment. The controller may only prevent the vehicle system from entering into the upcoming segment if the negative protection system sends a negative signal (indicating that the vehicle system cannot enter into the upcoming route segment).

The controller onboard the vehicle system can communicate the advisory signal to the positive or negative protection system responsive to identifying the change in the route. The protection system can then use this change in the route to control where other vehicle systems are allowed to travel. For example, the protection system can communicate movement authorities to the vehicle systems to prevent other vehicle systems from traveling over or through the segment of the route where the change in the route was detected, can reduce the speeds (e.g., speed limits) at which the vehicle systems are permitted to travel over or through the segment of the route where the change in the route was detected, or the like.

Optionally, the controller can communicate the advisory signal to the protection system responsive to not identifying or detecting a change in the route. For example, the controller can inform the protection system that the route does not appear to have changed states. The protection system can use this information communicated via the advisory signal to allow other vehicle systems to travel through the segment in which no change was detected and/or to allow other vehicle systems to travel through the segment in which no change was detected without any reduction in speed limit(s). For example, the vehicle system may receive a communication from the protection system that modifies or eliminates a reduced speed limit responsive to the off-board protection system being notified that the change in the route has not occurred.

The controller can communicate the advisory signal to an off-board location or system to request inspection and/or repair of the route. For example, responsive to detecting a change in the route, the controller can request that personnel at a dispatch facility, repair facility, or the like, to travel to the location where the change in the route was detected to inspect and/or repair the route. The advisory signal can indicate the location of interest (where the change was detected) and, optionally, the time at which the change was detected (or when the image data used to identify the change was obtained or generated).

The controller can communicate the advisory signal to other vehicle systems to notify the vehicle systems of detection of the change in the route and/or the lack of detecting a change in the route. For example, the controller can transmit the advisory signal to individual vehicle systems or broadcast the vehicle system to vehicle systems within communication range. The advisory signal can inform the vehicle systems of the location and/or date at which the change in the route was or was not detected. The vehicle systems, in turn, can use this information to control where and/or how the vehicle systems move (e.g., by slowing travel through the location where the change in the route was detected, by changing which route the vehicle systems travel on, etc.).

Optionally, the controller can implement one or more responsive actions with the vehicle system in which the controller is disposed responsive to detecting a change in the route. For example, the controller can restrict how fast the vehicle system is moving along the route responsive to determining that travel of the vehicle system may have caused a change in the route. This can help prevent further damage or changes to the route.

In one embodiment, the controller may obtain and/or compare the image data responsive to one or more triggers or trigger events occurring. As one example, the route may be more likely to be deformed by movement of the vehicle system in elevated ambient temperatures. Therefore, a trigger event may be an ambient temperature increasing above a threshold limit. One or more of the sensors onboard the vehicle system can include a temperature sensor. For example, one or more of the sensors 504, 506 (or an additional sensor) may include a thermometer, thermocouple, or the like, that measures an ambient temperature outside of the vehicle system. Alternatively, the temperature may not be measured by an onboard sensor, but may be reported or otherwise communicated to the controller from an off-board location or system, such as a weather reporting system. The controller can examine the ambient temperatures during movement of the vehicle system to determine whether the ambient temperature exceeds a designated elevated temperature threshold or limit. Responsive to the ambient temperature exceeding this threshold or limit, the controller may obtain and/or compare the image data to determine whether the route is changed due at least in part to movement of the vehicle system over the route. Another trigger or trigger event can be operator input. For example, the controller can obtain and/or compare the image data responsive to an operator providing input requesting the inspection of the route and/or indicating an elevated ambient temperature. Another trigger or trigger event can be a signal received from an off-board source, such as from a protection system.

Another trigger or trigger event may be used to cause the trailing optical sensor to obtain the image data based on location information and/or moving information. This location information can be a distance that separates the leading optical sensor from the trailing optical sensor. For example, the location information can be a distance measured along the path of the route from the leading optical sensor to the trailing optical sensor. The moving information can be a speed at which the vehicle system is moving. The controller can determine when to trigger the trailing optical sensor to obtain the image data following a time at which the leading optical sensor based on the distance and the moving speed. For example, the controller can calculate a period of time between when the field of views of the leading and trailing optical sensors will encompass the same location of interest in the route based on the distance between sensors and the moving speed. The controller can then trigger the trailing optical sensor to obtain the image data of the route following expiration of this defined period of time following the time at which the leading optical sensor obtained the image data.

In one embodiment, each or at least one of the optical sensors may obtain a set or series of images of the route, such as several separate images and/or frames of a video. The controller can then compare at least some of the images in the set obtained by the leading optical sensor with at least some of the images in the set obtained by the trailing optical sensor to determine whether a change in the route has occurred. The controller can determine which of the images in the sets of images to compare with each other based on the location information and/or moving information described above. This can ensure that the controller is comparing the image data from the leading optical sensor with the image data from the trailing optical sensor that show the same segment of the route.

The controller may examine the route based on the image data obtained by the leading and/or trailing optical sensors and using data from one or more other sensors. These other sensors may be included in or may be separate from the sensors 504, 506. The other sensors may be non-optical sensors, such as impact and/or vibration sensors. The data from these other sensors may confirm or refute the detection of a change in the route from the image data. For example, a difference in the image data may indicate a change in a segment of the route and vibrations measured by an accelerometer during movement of the vehicle system over the same route segment may confirm this change in the route segment. As another example, a difference in the image data may indicate a change in a segment of the route, but vibrations measured by an accelerometer during movement of the vehicle system over the same route segment may refute this change in the route segment.

The controller optionally can examine image data of the same segment of the route from different passages of the vehicle system over the route segment. For example, the changes in the route during a single passage of the route may be relatively small, thereby increasing the likelihood that a change in the route is missed by the controller. The controller can store or access image data acquired during other travels of the vehicle system over the route segment (during prior days, weeks, months, or years). The controller can compare these previously obtained sets of image data with each other and/or more recently obtained image data to determine whether the route is changing over time. The controller can compare image data obtained at different times with each other to identify the changes, as described above.

The controller also can obtain other information about the vehicle system and use this information in determining whether a difference in the image data indicates a change in the route. For example, the controller can determine an operational state of one or more vehicles in the vehicle system, such as whether vehicles are in high or low gear, the speed at which the vehicle or vehicle system is moving, etc. As another example, the controller can examine a manifest of cargo carried by the vehicle system (or absence thereof) to determine whether the vehicle system is loaded or unloaded, and/or the weight of the vehicle system. This additional information can be used to determine whether the route has changed. For example, if the difference between the image data is relatively small or minor, but the operational information indicates that a very heavy vehicle system was traveling at a high gear over the route, the controller may be more likely to determine that the route has changed. As another example, if the difference between the image data is relatively small or minor, and the operational information indicates that a lighter vehicle system was traveling at a lower gear over the route, the controller may be less likely to determine that the route has changed.

The controller can determine a health status of the vehicles in the vehicle system (propulsion-generating and/or non-propulsion-generating vehicles), such as the conditions of wheels of the vehicle system from a prior maintenance check or inspection, the amount of usage (e.g., miles), etc. This additional information can be used to determine whether the route has changed. For example, if the difference between the image data is relatively small or minor, but the operational information indicates that the health status of the vehicles is poor, the controller may be more likely to determine that the route has changed. As another example, if the difference between the image data is relatively small or minor, and the health status indicates less wear on the wheels, the controller may be less likely to determine that the route has changed.

Figure 23:
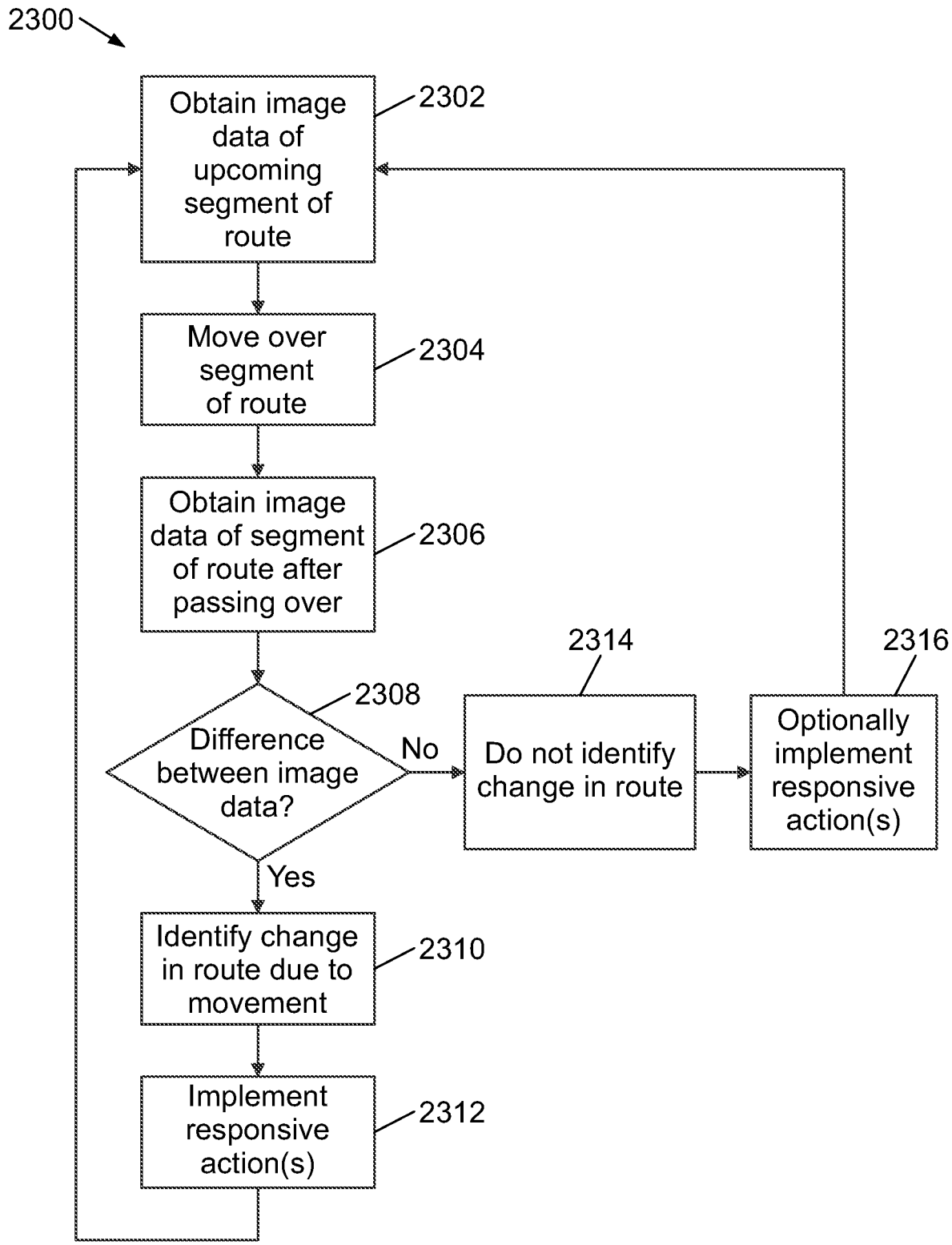
FIG. 23 illustrates a flowchart of one example of a method for inspecting a route.

FIG. 23 illustrates a flowchart of one example of a method 2300 for inspecting a route. The method 2300 can represent operations performed by and/or under direction of the controller to inspect a segment of a route before and after a vehicle system travels over the route segment. Alternatively, the operations can be performed by a controller that is off-board the vehicle system. For example, the image data can be compared and examined off-board the vehicle system to identify changes in the route.

At 2302, image data of an upcoming segment of a route is obtained. The image data can be one or more images and/or videos of an area ahead of a vehicle system as the vehicle system moves along the route. At 2304, the vehicle system moves over the segment of the route that is shown in the image(s) and/or video(s) obtained at 2302. At 2306, image data of the same segment of the route is obtained after the vehicle system passes over the segment of the route. For example, one or more images and/or videos of an area behind the vehicle system can be obtained such that the segment of the route depicted in the image data obtained at 2302 from ahead of the vehicle system also is depicted in the image data obtained at 2306 from behind the vehicle system.

At 2308, a determination is made as to whether one or more differences between the image data exists. The difference(s) can be changes to the route caused (at least in part) by movement of the vehicle system over the route. For example, the comparison may show that a rail of the route has moved, that a rut was formed (or widened or deepened) in the route by the vehicle system, that a pothole was formed (or widened or deepened) in the route by the vehicle system, that a crack was formed (or widened or deepened) in the route by the vehicle system, that debris was not fully removed from the route, or the like.

If a difference in the image data is identified, then the difference may indicate that the route was changed during passage of the vehicle system over the imaged segment of the route. As a result, flow of the method 2300 can proceed toward 2310. But, if a difference in the image data is not identified, then the absence of the difference may indicate that the route did not change from movement of the vehicle system over the imaged route segment. As a result, flow of the method 2300 can proceed toward 2314.

At 2310, a change in the route is identified in the segment that was imaged. This change can be a bending of a rail, digging of a rut, creation or enlarging of a pothole or crack, etc. At 2312, one or more responsive actions are implemented. The responsive actions can include communicating an advisory signal to off-board systems, communicating an advisory signal to other vehicle systems, slowing movement of the vehicle system, or the like, as described herein. Flow of the method 2300 can then return toward 2302 or may terminate.

If the difference in the image data is not identified at 2308, then the absence of the difference may indicate that the route did not change from movement of the vehicle system over the imaged route segment at 2314. At 2316, one or more responsive actions optionally may be implemented. For example, an advisory signal may be communicated to one or more off-board systems to notify the systems of the absence of a change in the route, as described above.

In any of the embodiments herein, the vehicle system in conjunction with which the system (e.g., route inspection system) is implemented may be a drone, other aerial vehicle, or other autonomous or remote controlled vehicle. For example, in one particular embodiment, a remote controlled or autonomous aerial drone (e.g., such as a quadcopter) is outfitted with one or more cameras or other optical sensors or other sensors that are configured to output sensor data of a route along which the drone travels, such as above a railway. The drone is controlled and/or configured to follow a path along the route in a manner by which the sensor data is suitable for use in determining a degree of curvature in the route based on a difference between a reference location and a location of interest, as explained herein. For example, if the route is a railway having two nominally parallel rails (i.e., for normal operation in an undamaged condition, the rails are configured to be parallel), the drone may be controlled and/or configured to follow a path along the midpoint between the rails, or to travel above and along one of the rails (e.g., a designated or chosen one of the rails), or to travel along one of the rails but a designated set lateral distance to the left or right of the rail. The one or more processors of the route inspection system may be deployed on board the autonomous or remote controlled vehicle, and/or the autonomous or remote controlled vehicle may transmit the sensor data to an off-board location where the one or more processors are located. Alternatively, one or more of the processors may be deployed on board the autonomous or remote controlled vehicle and one or more of the processors may be located in an off-board location. The off-board processor(s) may be located in a fixed, central location (such as a dispatch or maintenance facility), and/or they may be located on another vehicle or vehicle system. For example, an autonomous or remote controlled vehicle may be carried by a second vehicle or vehicle system (e.g., a drone carried by a locomotive), with the autonomous or remote controlled vehicle being dispatched from the second vehicle periodically for inspection purposes, e.g., ahead of the second vehicle or vehicle system traveling along a route. In such an embodiment, one or more of the route inspection system processors may be on board the second vehicle or vehicle system, with the autonomous or remote controlled vehicle configured to transmit sensor data back to the second vehicle or vehicle system for processing and use by the second vehicle or vehicle system (e.g., for control purposes).

In one embodiment, a method includes obtaining first image data of a route at a location of interest from a first optical sensor disposed onboard a vehicle system moving along the route. The first image data depicts the route at the location of interest prior to passage of the vehicle system over the route at the location of interest. The method also includes obtaining second image data of the route at the location of interest from a second optical sensor disposed onboard the vehicle system. The second image data depicts the route at the location of interest after passage of the vehicle system over the route at the location of interest. The method also includes determining whether a change in the route has occurred at the location of interest by comparing the first image data with the second image data.

Optionally, the method also can include determining whether an ambient temperature exceeds a designated upper limit. Obtaining one or more of the first image data or the second image data can occur responsive to determining that the ambient temperature exceeds the designated upper limit.

Optionally, the method also can include determining the ambient temperature from a sensor onboard the vehicle system.

Optionally, the method also can include determining the ambient temperature from an off-board system that is off-board the vehicle system.

Optionally, obtaining the first image data occurs from the first optical sensor disposed at a leading end of the vehicle system and obtaining the second image data occurs from the second optical sensor disposed at an opposite, trailing end of the vehicle system.

Optionally, the vehicle system is formed from at least a leading vehicle and a trailing vehicle, and obtaining the first image data occurs from the first optical sensor disposed on the leading vehicle and obtaining the second image data occurs from the second optical sensor disposed on the trailing vehicle.

Optionally, obtaining the second image data occurs responsive to a defined period of time expiring following obtaining the first image data, the defined period of time based on a distance between the first optical sensor and the second optical sensor and a speed at which the vehicle system is moving.

Optionally, determining whether the change in the route has occurred includes obtaining a mirror image of the first image data or the second image data, and comparing the mirror image with the first image data or the second image data.

Optionally, determining whether the change in the route has occurred includes determining a reference location in the first image data and the second image data and determining a difference between the location of interest and the reference location. Determining whether the change in the route has occurred can be based on the difference.

Optionally, obtaining the first image data includes obtaining a first set of image frames of the route and obtaining the second image data includes obtaining a second set of image frames of the route, and determining whether the change in the route has occurred includes comparing the first set of the image frames with the second set of the image frames.

Optionally, the vehicle system is a first vehicle system, and the method also can include notifying an off-board protection system of the change in the route. The off-board protection system can issue a movement authority to one or more additional vehicle systems to limit a speed at which the one or more additional vehicle systems move over the location of interest.

Optionally, the vehicle system moves along the route according to a reduced speed limit issued by an off-board protection system, and the method also can include notifying the off-board protection system that the change in the route has not occurred, and receiving a modification or elimination of the reduced speed limit from the off-board protection system responsive to the off-board protection system being notified that the change has not occurred.

Optionally, the method also can include communicating a request to an off-board system to one or more of inspect or repair the route at the location of interest responsive to determining that the change in the route has occurred.

Optionally, the method also can include restricting a speed at which the vehicle system moves along the route responsive to determining that the change in the route has occurred.

Optionally, the change in the route includes one or more of a bend in a rail of a track, an indentation in the route, a rut in the route, a pothole in the route, or an uncleaned area of the route.

In one embodiment, a system includes a controller configured to obtain first image data of a route at a location of interest from a first optical sensor disposed onboard a vehicle system moving along the route. The first image data depicts the route at the location of interest prior to passage of the vehicle system over the route at the location of interest. The controller also is configured to obtain second image data of the route at the location of interest from a second optical sensor disposed onboard the vehicle system. The second image data depicts the route at the location of interest after passage of the vehicle system over the route at the location of interest. The controller is configured to determine whether a change in the route has occurred at the location of interest by comparing the first image data with the second image data.

Optionally, the controller is configured to determine whether an ambient temperature exceeds a designated upper limit, the controller configured to obtain one or more of the first image data or the second image data responsive to determining that the ambient temperature exceeds the designated upper limit.

Optionally, the controller is configured to obtain the first image data from the first optical sensor disposed at a leading end of the vehicle system and the second image data from the second optical sensor disposed at an opposite, trailing end of the vehicle system.

In one embodiment, a system includes a controller configured to examine image data of a common segment of a route obtained before and after passage of a vehicle system over the common segment of the route. The controller is configured to determine one or more differences between the image data and to determine that the common segment of the route is damaged by passage of the vehicle system based on the one or more differences that are determined.

Optionally, the controller is configured to determine the one or more differences by comparing a first set of the image data obtained ahead of a direction of movement of the vehicle system with a second set of the image data obtained behind the direction of movement of the vehicle system.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

The above description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are example embodiments. Other embodiments may be apparent to one of ordinary skill in the art upon reviewing the above description. The scope of the inventive subject matter should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
obtaining first image data of a route at a location of interest from a first optical sensor disposed onboard a vehicle system moving along the route, the first image data depicting the route at the location of interest prior to passage of the vehicle system over the route at the location of interest;
obtaining second image data of the route at the location of interest from a second optical sensor disposed onboard the vehicle system, the second image data depicting the route at the location of interest after passage of the vehicle system over the route at the location of interest, wherein obtaining the second image data occurs responsive to a defined period of time expiring following obtaining the first image data, the defined period of time based on a distance between the first optical sensor and the second optical sensor and a speed at which the vehicle system is moving; and
determining whether a change in the route has occurred at the location of interest by comparing the first image data with the second image data.

2. The method of claim 1, further comprising:
determining whether an ambient temperature exceeds a designated upper limit, wherein obtaining one or more of the first image data or the second image data occurs responsive to determining that the ambient temperature exceeds the designated upper limit.

3. The method of claim 2, further comprising:
determining the ambient temperature from a sensor onboard the vehicle system.

4. The method of claim 2, further comprising:
determining the ambient temperature from an off-board system that is off-board the vehicle system.

5. The method of claim 1, wherein obtaining the first image data occurs from the first optical sensor disposed at a leading end of the vehicle system and obtaining the second image data occurs from the second optical sensor disposed at an opposite, trailing end of the vehicle system.

6. The method of claim 5, wherein the vehicle system is formed from at least a leading vehicle and a trailing vehicle, and obtaining the first image data occurs from the first optical sensor disposed on the leading vehicle and obtaining the second image data occurs from the second optical sensor disposed on the trailing vehicle.

7. The method of claim 1, wherein determining whether the change in the route has occurred includes obtaining a mirror image of the first image data or the second image data, and comparing the mirror image with the first image data or the second image data.

8. The method of claim 1, wherein determining whether the change in the route has occurred includes determining a reference location in the first image data and the second image data and determining a difference between the location of interest and the reference location,
wherein determining whether the change in the route has occurred is based on the difference.

9. The method of claim 1, wherein obtaining the first image data includes obtaining a first set of image frames of the route and obtaining the second image data includes obtaining a second set of image frames of the route, and determining whether the change in the route has occurred includes comparing the first set of the image frames with the second set of the image frames.

10. The method of claim 1, wherein the vehicle system is a first vehicle system, and further comprising:
notifying an off-board protection system of the change in the route, the off-board protection system issuing a movement authority to one or more additional vehicle systems to limit a speed at which the one or more additional vehicle systems move over the location of interest.

11. The method of claim 1, wherein the vehicle system moves along the route according to a reduced speed limit issued by an off-board protection system, and further comprising:
notifying the off-board protection system that the change in the route has not occurred; and
receiving a modification or elimination of the reduced speed limit from the off-board protection system responsive to the off-board protection system being notified that the change has not occurred.

12. The method of claim 1, further comprising:
communicating a request to an off-board system to one or more of inspect or repair the route at the location of interest responsive to determining that the change in the route has occurred.

13. The method of claim 1, further comprising:
restricting a speed at which the vehicle system moves along the route responsive to determining that the change in the route has occurred.

14. The method of claim 1, wherein the change in the route includes one or more of a bend in a rail of a track, an indentation in the route, a rut in the route, a pothole in the route, or an uncleaned area of the route.

15. A system comprising:
a controller configured to obtain first image data of a route at a location of interest from a first optical sensor disposed onboard a vehicle system moving along the route, the first image data depicting the route at the location of interest prior to passage of the vehicle system over the route at the location of interest, the controller also configured to obtain second image data of the route at the location of interest from a second optical sensor disposed onboard the vehicle system, the second image data depicting the route at the location of interest after passage of the vehicle system over the route at the location of interest, wherein the second image data is obtained responsive to a defined period of time expiring following the first image data being obtained, the defined period of time based on a distance between the first optical sensor and the second optical sensor and a speed at which the vehicle system is moving, the controller configured to determine whether a change in the route has occurred at the location of interest by comparing the first image data with the second image data.

16. The system of claim 15, wherein the controller is configured to determine whether an ambient temperature exceeds a designated upper limit, the controller configured to obtain one or more of the first image data or the second image data responsive to determining that the ambient temperature exceeds the designated upper limit.

17. The system of claim 15, wherein the controller is configured to obtain the first image data from the first optical sensor disposed at a leading end of the vehicle system and the second image data from the second optical sensor disposed at an opposite, trailing end of the vehicle system.

18. A system comprising:
a controller configured to examine image data of a common segment of a route obtained before and after passage of a vehicle system over the common segment of the route, the controller configured to determine one or more differences between the image data and to determine that the common segment of the route is damaged by passage of the vehicle system based on the one or more differences that are determined,
wherein the controller is configured to determine the one or more differences by comparing a first set of the image data obtained ahead of a direction of movement of the vehicle system with a second set of the image data obtained behind the direction of movement of the vehicle system, and wherein the second set of the image data is obtained responsive to a defined period of time expiring following the first set of the image data being obtained.

* * * * *